United States Patent
Packard et al.

(10) Patent No.: US 8,595,763 B1
(45) Date of Patent: *Nov. 26, 2013

(54) GENERATING TEASERS FOR LIVE PERFORMANCES

(75) Inventors: Warren Joseph Packard, Palo Alto, CA (US); Robert John Barcklay, Berkeley, CA (US); Alan Levin, Vancouver (CA); Michael Bruce Schmier, San Mateo, CA (US)

(73) Assignee: Thuuz, Inc., Palo Alto, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 13/601,933

(22) Filed: Aug. 31, 2012

(51) Int. Cl.
*H04N 7/025* (2006.01)
*H04N 7/10* (2006.01)

(52) U.S. Cl.
USPC .................. 725/34; 725/32; 725/33; 725/40; 725/108

(58) Field of Classification Search
USPC ........................ 725/32–34, 40, 108
See application file for complete search history.

(56) References Cited

U.S. PATENT DOCUMENTS

| | | | |
|---|---|---|---|
| 2009/0094628 A1* | 4/2009 | Lee et al. | 725/10 |
| 2010/0154000 A1* | 6/2010 | Macrae et al. | 725/41 |
| 2010/0262995 A1* | 10/2010 | Woods et al. | 725/40 |
| 2011/0212756 A1 | 9/2011 | Packard | |
| 2012/0122592 A1 | 5/2012 | Stafford | |
| 2012/0143683 A1 | 6/2012 | Hertz | |
| 2012/0166449 A1 | 6/2012 | Pitaliya | |
| 2012/0189273 A1* | 7/2012 | Folgner et al. | 386/241 |

OTHER PUBLICATIONS

U.S. Appl. No. 13/601,927, filed Aug. 31, 2012.
U.S. Appl. No. 13/601,915, filed Aug. 31, 2012.

* cited by examiner

*Primary Examiner* — Mulugeta Mengesha
(74) *Attorney, Agent, or Firm* — Vierra Magen Marcus LLP

(57) ABSTRACT

A live performance is monitored by analyzing an input data stream comprising real-time updates related to the live performance. Different sets of excitement levels, excitement curves, alerts and teasers are generated based on the analysis and reported to a plurality of subscribers using any of a variety of mobile communication and/or computing devices.

13 Claims, 12 Drawing Sheets

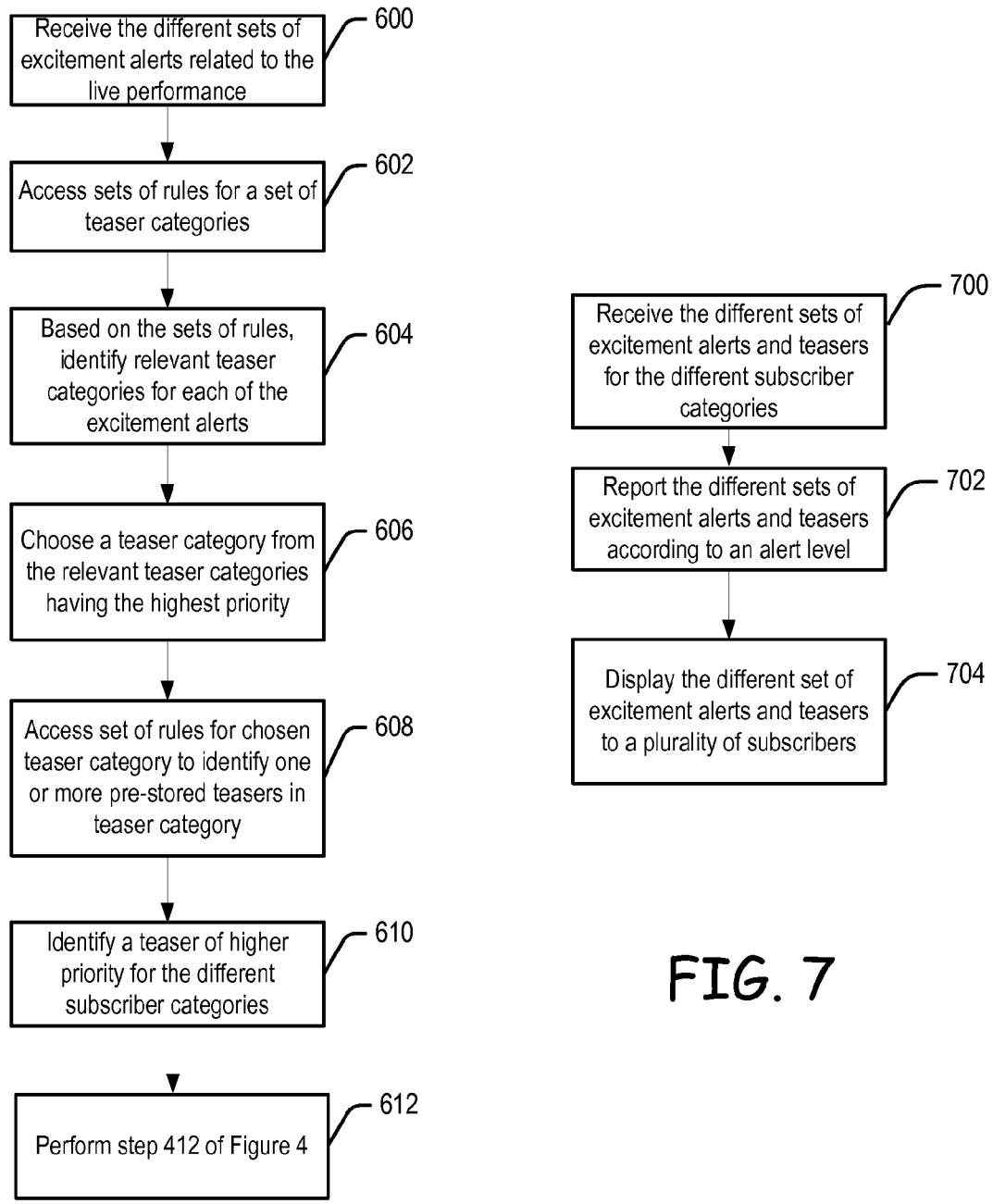

GENERATING TEASERS FOR LIVE PERFORMANCES

BACKGROUND

There are many services that provide game highlights, box scores, and performance commentary for sporting events. However, these services generally spoil the excitement of any recorded sports performances by revealing the score, statistics, and highlights of what transpired. A fan seeking to watch highlights of a game that he or she missed or a fan reminded of a game that is being or was missed is typically informed of the outcome of the performance, causing the fan to miss out on the excitement of experiencing the buildup of game's events as they unfold.

Additionally, with the amount of performances available over the Internet and time-shifted to a DVR, sports fans can spend precious hours viewing a boring game or one that simply turns out as expected. Furthermore, what may be an exciting event for one sports fan may be uneventful to another sports fan. Currently available services merely broadcast a game's highlights without considering the myriad preferences of the game's audience that make the game more exciting or less exciting for individual fans. This results in the inefficient use of the sports fans' time, a potential decrease in advertisement revenue, and the loss of viewership and does not allow a fan to experience all the thrill of the game as it unfolds in front of them.

BRIEF DESCRIPTION OF THE DRAWINGS

The components in the drawings are not necessarily to scale relative to each other. Like reference numerals designate corresponding parts throughout the several views.

FIG. 6 is a flow chart describing one embodiment of a process for automatically generating different sets of teasers for a live performance, for different subscriber categories.

FIG. 7 is a flow chart describing a process for reporting different sets of alerts and teasers to a plurality of subscribers.

DETAILED DESCRIPTION

Figure 1A:
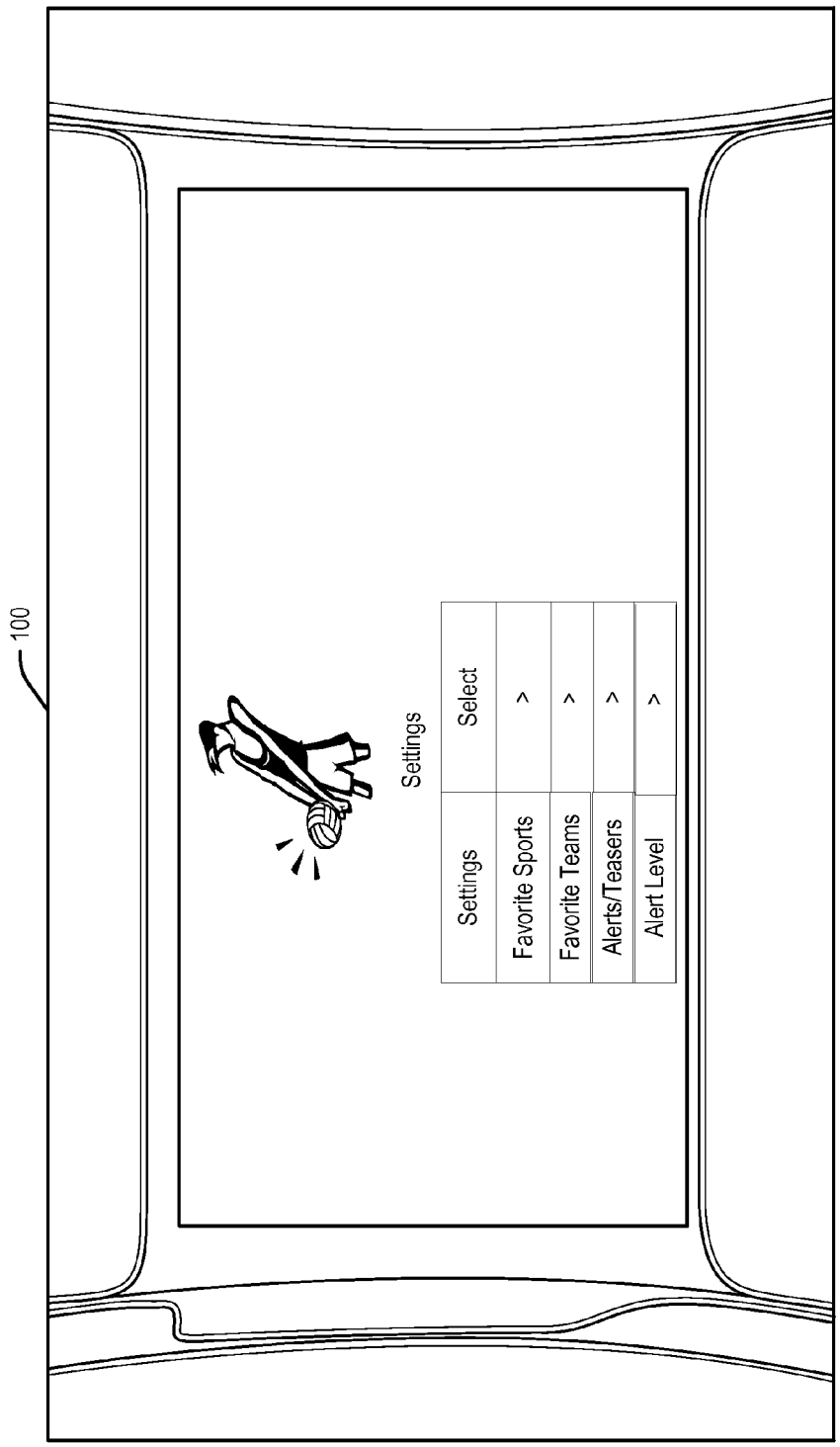
FIG. 1A is an exemplary user-interface screen that is used to obtain one or more subscriber preferences from a subscriber.

The technology disclosed herein relates to generating excitement ratings. alerts and teasers for live performances. As used herein, a live performance refers to any live action or content that has an element of uncertainty, suspense, surprise or competitiveness associated with it. The disclosed technology directs sports (or other types of) fans and enthusiasts to the best live performances being played, while preserving the emotional thrill of watching the live performance play out. Individuals are alerted to the most exciting live performances being played and when to start watching them. Based on this information, individuals can tune into the live performance and jump right into the action, whether on their television, mobile device, computer, or at the live venue.

In order to preserve the suspense of events that fans may not be able to watch live, the disclosed technology can indicate only the excitement level of a match, without revealing the score or other spoilers, if the fan so desires. Individuals or fans who elect to time shift their viewing have confidence that the live performance they are watching is going to be truly exciting without knowing anything else about the live performance, thus allowing them to experience the thrill of the live performance as it unfolds in front of them.

In one set of embodiments, the disclosed technology generates different excitement levels for live performances based on factors that might make a live performance more exciting or less exciting for different categories of subscribers and/or by analyzing live feeds of play-by-play statistics related to the live performances. In one embodiment, the different categories of subscribers relate to fans of a particular type of performance, team, league, player, division, conference, game, sport, genre or other variable. In one example, the different categories of subscribers include home team fans, visiting team fans and neutral fans. As used herein, a home team fan refers to a subscriber who is a fan of (or otherwise has an affinity for) the team that hosts the live performance, the visiting team fan refers to a subscriber who is a fan of (or otherwise has an affinity for) the team opposing the home team, and the neutral fan does not have a preference or affinity for the home team or the visiting team. In some embodiments, the live performance may involve more than two teams and/or one or more individuals. In some embodiments, the excitement levels, curves, alerts and teasers described herein can be generated separately for home team fans, visiting team fans and neutral fans. When the live performance involves more than two teams and/or one or more individuals, the excitement levels, curves, alerts and teasers described herein can be generated separately for each of the multiple teams and/or individuals. Teasers are brief summaries of one or more compelling aspects of a performance in progress. They may be constructed from fixed text and/or one or more regular expressions that may include (but are not limited to) team names, player names, period/quarter/half, time elapsed, time left, scores, statistics, plays, other game events, player or team performance notes, and game situations.

Excitement levels, curves, alerts and teasers can also be generated for other groups of people. For example, excitement levels, curves, alerts and teasers described herein can be generated separately for different subscribers based on subscriber's affinity for fast paced games, games with huge momentum swings, games with great historical context, or other categories. Example subscriber categories may relate to the type of event that a subscriber finds exciting, such as a crash within an auto racing performance or an occurrence of a fight during a hockey game.

In another set of embodiments, the disclosed technology generates alerts and teasers when the live performance begins to get exciting. The teasers include sentence fragments that explain why the live performance is exciting. Different sets of alerts and teasers are generated for different categories of subscribers.

In another set of embodiments, the disclosed technology generates teasers at all times during a live performance, whether or not the performance is at a level of excitement to trigger one or more alerts.

The different sets of excitement levels, excitement curves, alerts and teasers are reported to a plurality of subscribers based on one or more subscriber preferences. In one example, the subscriber preferences include a list of the subscriber's favorite sports, favorite teams, favorite players, types of sport (for example, low scoring games). Subscriber preferences may also include whether the subscriber wishes to receive alerts and teasers related to the live performance and the subscriber's desired alert level. The alert level relates to the number of alerts that the subscriber wishes to receive during a live performance and when the subscriber wishes to be notified of such alerts. Subscriber preferences may also include a subscriber's display preference for viewing the different sets of excitement levels, excitement curves, alerts and teasers related to the live performances. Some subscribers may wish to view the different excitement curves depending on whether they are a home team fan, a visiting team fan, or a neutral fan. Others may wish to just view a subset of the excitement curves.

In one embodiment, the different sets of excitement levels are reported to the plurality of subscribers as different sets of excitement curves. The different sets of excitement curves graphically represent the different sets of excitement levels over different points in time during the live performance. In one example, the excitement level for a live performance is a rating given to the live performance on a scale of 0 to 100, with 0 being a boring event and 100 being an extremely exciting event. In one set of examples, three (or more) excitement curves are generated: one for the home team fan, one for the visiting team fan and one for the neutral fan. In other examples, additional excitement curves are generated, such as for a fan who does not like one of the teams, a fan who likes a team that is a rival to one of the teams or a fan who likes any close game. Subscribers can view the excitement curves to decide whether to tune in to a live performance or watch a recorded performance.

Figure 1B:
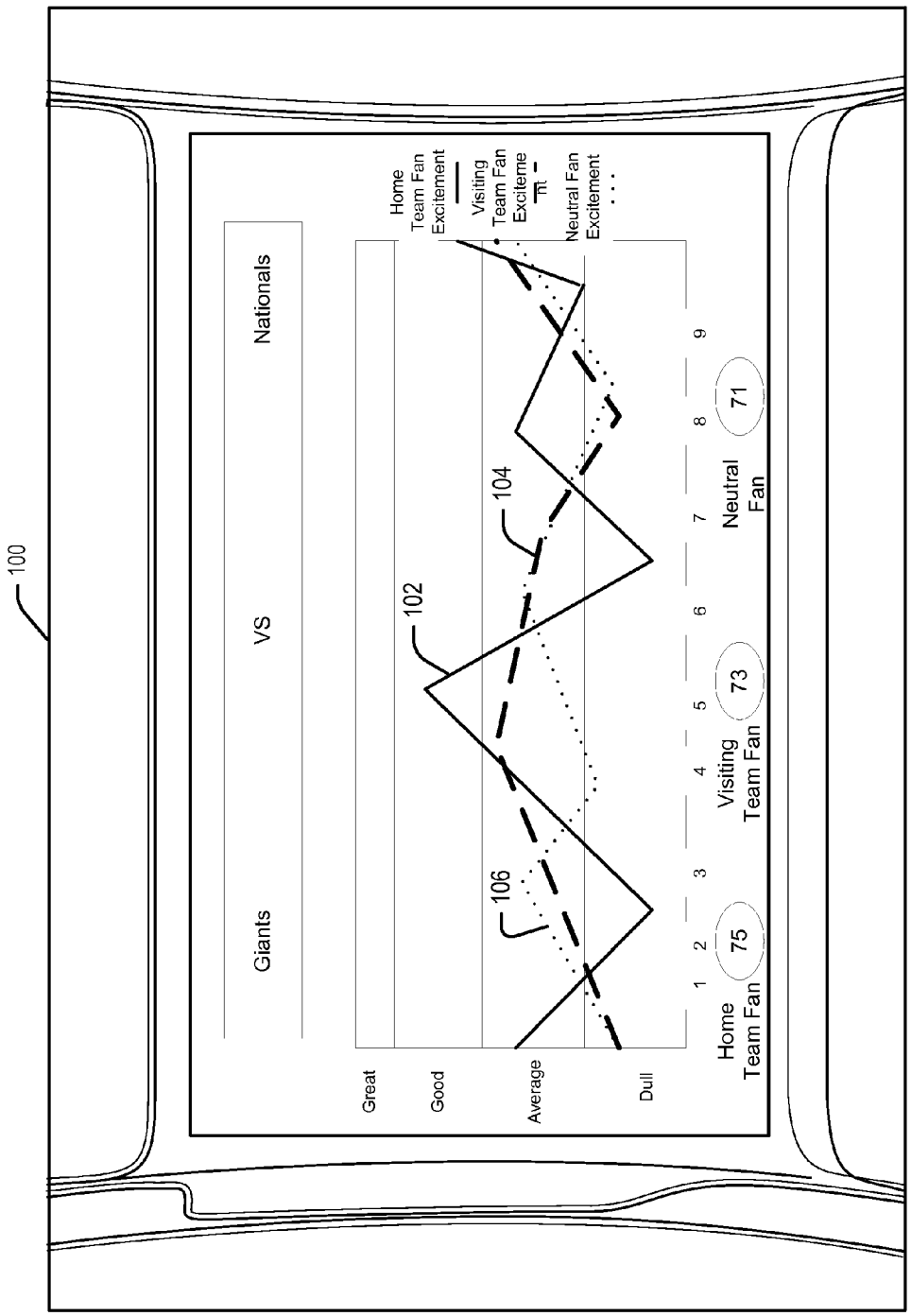
FIG. 1B is an exemplary user-interface screen that displays different sets of excitement curves to a subscriber based on the subscriber preferences obtained in FIG. 1A.

In one embodiment, subscribers may view the different sets of excitement levels, excitement curves, alerts and teasers related to multiple live performances, access real-time content related to the live performance and the like, via an Internet based web site or using an application (collectively referred to herein as a "Sports Excitement Rating Application 100") on a computing device (e.g., cellular telephone, laptop computer, desktop computer, tablet computer, smart appliance, etc.) that is referred to herein as the client device. FIG. 1A and FIG. 1B are exemplary user-interface screens in the subscriber's client device via which a subscriber can interact with a service that provides the excitement levels, excitement curves, alerts and teasers described herein.

FIG. 1A is an exemplary user-interface screen depicted on the client device that is used to obtain one or more subscriber preferences from a subscriber. In one example, one or more subscriber preferences such as the subscriber's favorite sports, favorite teams, whether the subscriber wishes to receive alerts and teasers related to one or more live performances and the subscriber's desired alert level are obtained from the subscriber via the Sports Excitement Rating Application 100. This information can then be stored on the client device and/or transmitted to a server for the service associated with the Sports Excitement Rating Application 100.

FIG. 1B is an exemplary user-interface screen that displays different sets of excitement curves to a subscriber based on the subscriber preferences obtained in FIG. 1A. For example, if the subscriber's favorite teams included the home team in a live performance, then a game excitement curve related to the home team sentiment is displayed to the subscriber. In one embodiment, if the subscriber's favorite teams included both the home team and the visiting team participating in the live performance, then a game excitement curve related to both the home team and the visiting team sentiments are displayed to the subscriber.

In the exemplary illustration of FIG. 1B, different excitement curves for the home team fans, visiting team fans and neutral fans are displayed to a subscriber based on the subscriber's preferences. In the illustrated example, the y-axis of the curve includes qualitative assignments made to the excitement levels of a live performance. In one embodiment, a qualitative assignment of a great game is made to a live performance whose excitement levels are between 85-100, qualitative assignment of a good game is made to a live performance whose excitement levels are between 65-84, a qualitative assignment of an average game is made to a live performance whose excitement levels are between 40-64 and a qualitative assignment of a dull game is made to a live performance whose excitement levels are between 0-39. The x-axis of the curve illustrates exemplary points in time in the live performance during which the excitement levels are generated. In the exemplary illustration, a first excitement curve 102 is a game excitement curve for the home team fan, a second excitement curve 104 is a game excitement curve for the visiting team fan and a third excitement curve 106 is a game excitement curve for the neutral fan. The final excitement levels for the first excitement curve 102, the second excitement curve 104 and the third excitement curve 106 are 75, 73 and 71 respectively. While some embodiments will display all three curves, other embodiments display a subset of the three curves. Additional embodiments can display more than three curves or different curves.

Figure 2:
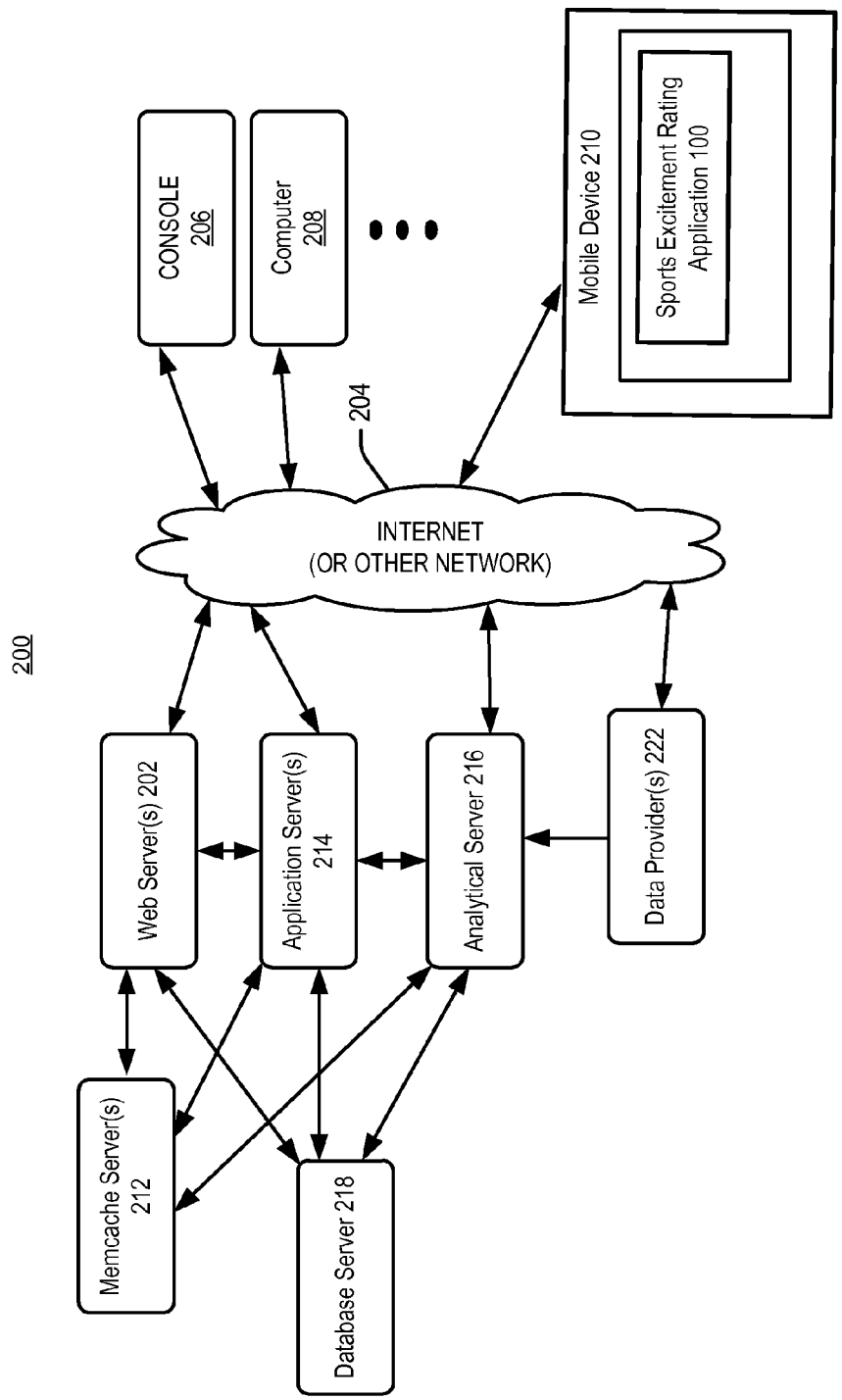
FIG. 2 is a block diagram of one embodiment of hardware components of a system for generating excitement levels, excitement curves, alerts and teasers for a live performance.

FIG. 2 is a block diagram of one embodiment of the hardware components of a system for generating excitement levels, excitement curves, alerts and teasers for a live performance. In one embodiment, the system of FIG. 2 is described with respect to generating excitement levels, excitement curves, alerts and teasers for a live sporting performance; however, the teachings herein apply to non-sport related performances. It is to be appreciated that the technology described herein is not limited to generating excitement levels, excitement curves, alerts and teasers for a live sports performance. For example, the technology described herein can be utilized to generate excitement levels, excitement curves, alerts and teasers for a reality TV show, a news event, a game show, political action, a business show, a drama or other episodic content.

In one embodiment, system 200 generates different sets of excitement levels, excitement curves, alerts and teasers for multiple live performances for different subscriber categories by analyzing live feeds of play-by-play statistics/metrics/data related to the live performance. In one set of examples, three sets of excitement levels, excitement curves, alerts and teasers are generated for the different subscriber categories: one for the home team fan, one for the visiting team fan and one for the neutral fan.

In one embodiment, system 200 includes one or more Web Server(s) 202 coupled via a network 204 to one or more Client Devices 206, 208 and 210. Network 204 may be a public network, a private network, or a combination of public and private networks such as the Internet. Network 204 can be a LAN, WAN, wired, wireless and/or combination of the above. The Client Devices 206, 208 and 210 may include a conventional computing device, such as a desktop computer, laptop computer, cellular telephone, a smartphone, tablet computer, TV, set-top box, or any other type of computing system capable of connecting to the Network 204, either by a wire or wirelessly. The Client Devices may also include a recording device capable of receiving live performances such as a DVR, PVR or other media recording devices. In one embodiment, the Client Devices comprise a console 206, a personal computer 208 and a mobile device 210. Although FIG. 2 shows three client devices, it is anticipated that the system would be used by many client devices.

Web Server(s) 202 include one or more physical computing devices and/or software that can receive requests from Client Devices 206, 208 and 210 and respond to those requests with data, as well as send out unsolicited alerts, teasers and other messages. Web Server(s) 202 may employ various strategies for fault tolerance and scalability such as load balancing, caching and clustering. In one embodiment, Web Server(s) 202 may include one or more Memcache Server(s) 212 which may serve as a transitory cache to store client requests and information related to the live performance. Memcache Server (212) can be updated/accessed by Web, Server(s) 202, Application Servers (214) and Analytical Server(s) 216.

Web Server(s) 202 maintain, or otherwise designate, one or more Application Server(s) 214 to respond to requests received from Client Devices 206, 208 and 210. Application Server(s) 214 provides access to the business logic for use by client application programs in Client Devices 206, 208 and 210. Application Server(s) 214 may be co-located, co-owned, or co-managed with Web Server(s) 202. Application Server(s) 214 may also be remote from Web Server(s) 202. In one embodiment, Application Server(s) 214 interact with an Analytical Server 216 and a Database Server 218 to perform one or more operations of the disclosed technology.

In an exemplary operation of System 200, one or more subscribers on Client Devices 206, 208 and 210 who wish to view different excitement levels, excitement curves, alerts and teasers related to one or more live performances invoke the Sports Excitement Rating Application 100 via a user interface in the subscriber's client device. In one embodiment, a list of a subscriber's preferences comprising the subscriber's favorite sports and teams within each sport that the subscriber wishes to receive excitement ratings for is received by the Sports Excitement Rating Application 100 via a user interface on the client device (see FIG. 1A).

Analytical Server 216, which may include one or more computing devices, analyzes live feeds of play-by-play statistics related to one or more live performances from Data Providers 222. Examples of Data Providers 222 may include, but are not limited to, providers of real-time sports information such as STATS, OPTA and Sports Direct™. In one embodiment, Analytical Server 216 generates different sets of excitement levels and excitement curves for one or more live performances for different categories of subscribers based on the analysis. In other embodiments, Analytical Server 216 also generates different sets of alerts and different sets of teasers related to the live performances for different categories of subscribers. The operations performed by Analytical Server 216 are described in more detail below.

Application Server(s) 214 receives the different sets of excitement levels, excitement curves, alerts and teasers generated by the Analytical Server 216. Application Server(s) 214 sends the different sets of excitement levels, excitement curves, alerts and teasers to a plurality of subscribers on Client Devices 206, 208 and 210 via Web server(s) 202. In one embodiment, Application Server(s) 214 may also customize the different sets of excitement levels, excitement curves, alerts and teasers prior to sending the different sets of excitement levels, excitement curves, alerts and teasers to the plurality of subscribers, based on the subscribers' preferences. The operations performed by Application Server(s) 214 are described in more detail below. The different sets of excitement levels, excitement curves, alerts and teasers are displayed to the plurality of subscribers via the Sports Excitement Rating Application 220 on the subscribers' client devices.

Database Server 218 stores the results received from the Analytical Server 216 and Application server(s) 214. In one embodiment, the results include different sets of excitement levels, excitement curves, alerts and teasers related to one or more live performances. Database server 218 also stores information such as the real-time updates related to the live performances received from Data Providers 222, and subscriber preferences related to a plurality of subscribers in the system.

Figure 2A:
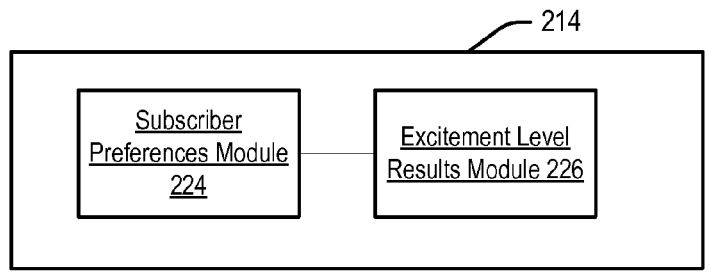
FIG. 2A is a block diagram depicting one embodiment of software components of the Application server(s) depicted in FIG. 2.

FIG. 2A is a block diagram depicting one embodiment of the software components of the Application server(s) depicted in FIG. 2. In one embodiment, Application Server(s) 214 includes a Subscriber Preferences Module 224, and an Excitement Level Results Module 226. Subscriber Preferences module 224 receives a list of subscriber preferences from a plurality of subscribers utilizing the Sports Excitement Rating Application 220 via Client Devices 206, 208 and 210. In one embodiment, Subscriber Preferences Module 224 includes a list of a subscriber's favorite sports, favorite teams, favorite players, whether the subscriber wishes to receive alerts and teasers related to the live performance, the subscriber's desired alert level and the subscriber's display preference information.

Excitement Level Results Module 226 receives different sets of excitement levels and excitement curves related to the live performances for different categories of subscribers from the Excitement Level Generation Module 230 in the Analytical server 216. Excitement Level Results module 226 also receives different sets of alerts from the Excitement Alert Generation Module 232 and different sets of teasers from the Teaser Generation Module 234 in the Analytical Server 216. In one embodiment, Excitement Level Results Module 226 reports the different sets of excitement levels, excitement curves, alerts and teasers to a plurality of subscribers of System 200 in accordance with the subscribers' preferences. FIGS. 4-7 describe the operations performed by the software modules in Application Server 214 in more detail.

Figure 2B:
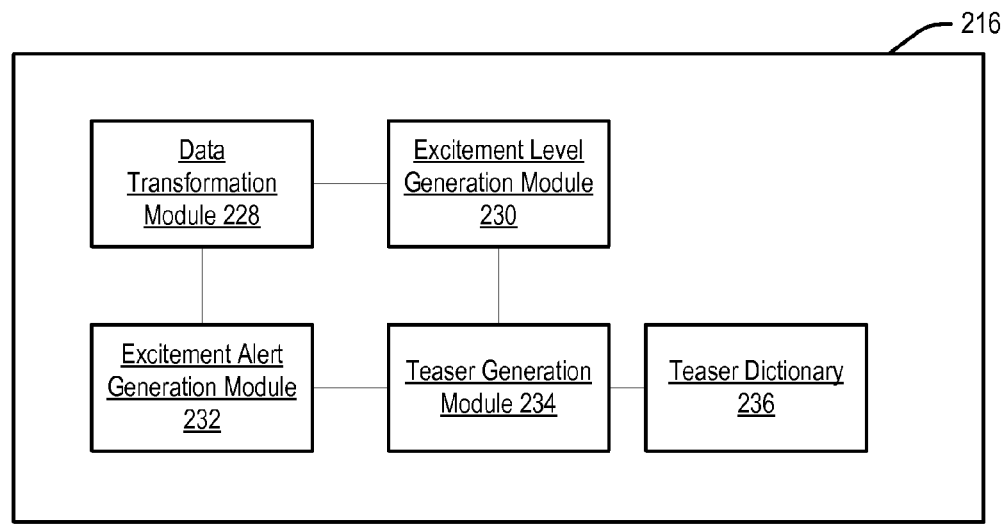
FIG. 2B is a block diagram depicting one embodiment of the software components of the Analytical Server depicted in FIG. 2.

FIG. 2B is a block diagram depicting one embodiment of the software components of the Analytical Server illustrated in FIG. 2. In one embodiment, Analytical Server 216 includes a Data Transformation Module 228, an Excitement Level Generation Module 230, an Excitement Alert Generation Module 232, a Teaser Generation Module 234, and a Teaser Dictionary 236. Data Transformation Module 228 receives and analyzes live feeds such as play-by-play statistics related to live performances from one or more Data Providers 222. Excitement Level Generation Module 230 generates different excitement levels for different subscriber categories based on the analysis performed by the Data Transformation Module 228.

Excitement Alert Generation Module 232 generates different sets of alerts for different subscriber categories based on the different sets of excitement levels generated by the Excitement Level Generation Module 230. Teaser Generation Module 234 generates different sets of teasers for different subscriber categories based on the different sets of alerts generated by the Excitement Alert Generation Module 232. Teaser Dictionary 238 includes a plurality of teasers, arranged as different categories of teasers. Each category of teasers includes a set of rules and a set of teasers that define each category. The operations performed by the software modules in the Analytical Server are discussed in detail in FIGS. 4-7.

Figure 3:
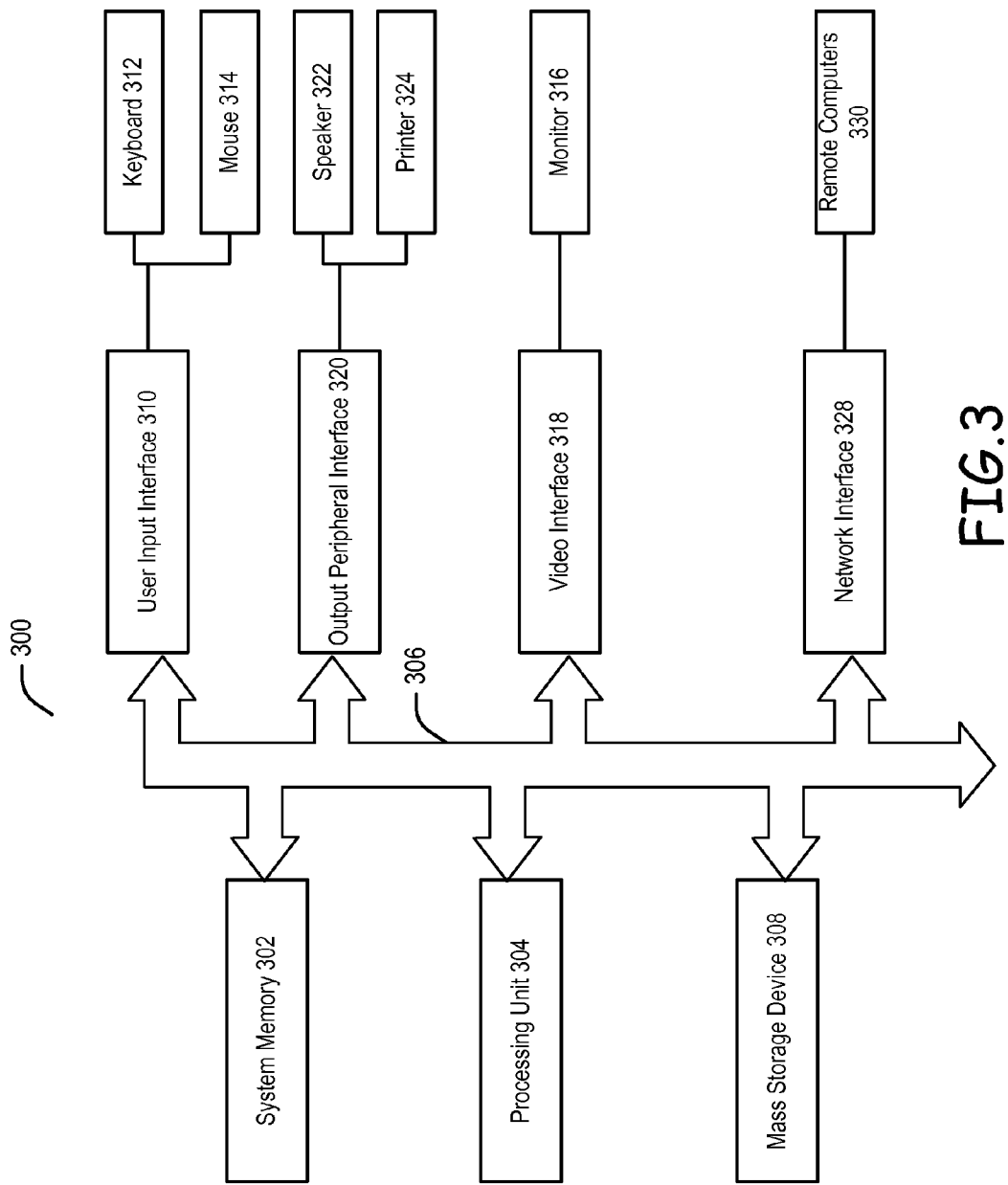
FIG. 3 illustrates one example of a general purpose computing device which can be used to implement any of the computing devices illustrated in FIG. 2.

FIG. 3 illustrates a general purpose computing device which can be used to implement any of the computing devices shown in FIG. 2. For example, the general purpose computing device described in FIG. 3 can be used to implement computing devices in the Application server(s) 214, Analytical server(s) 216 or any of the client devices 206, 208 and 210. Computing system 300 of FIG. 3 includes a System Memory 302, a Processing Unit (also known as a processor) 304 and a System Bus 306 that couples various system components including the System Memory 302 to the Processing Unit 304. The System Bus 306 may be any of several types of bus structures including a memory bus or memory controller, a peripheral bus, and a local bus using any of a variety of bus architectures.

System Memory 302 stores, in part, instructions and data for execution by Processing Unit 304 in order to perform the process described herein. System Memory 302 includes computer storage media in the form of volatile and/or nonvolatile memory such as read only memory (ROM) and random access memory (RAM). A basic input/output system (BIOS), containing the basic routines that help to transfer information between elements within computer 300, such as during start-up, is typically stored in the ROM. RAM typically contains data and/or program modules that are immediately accessible to and/or presently being operated on by Processing Unit 304.

The system of FIG. 3 further includes a Mass Storage Device 308. Mass Storage Device 308, which may be implemented with a magnetic disk drive, an optical disk drive or flash memory, is a non-volatile storage device for storing data and instructions for use by Processing Unit 304. In one embodiment, Mass Storage Device 308 stores the system software for implementing the processes described herein for purposes of loading to System Memory 302.

A user may enter commands and information into the computer 300 through input devices such as a Keyboard 312 and Pointing device 314, commonly referred to as a mouse, trackball, touch pad or touch screen. Other input devices (not shown) may include a microphone, joystick, game pad, satellite dish, scanner, or the like. These and other input devices are often connected to the Processing Unit 304 through a User Input Interface 310 that is coupled to the System Bus 306, but may be connected by other interface and bus structures, such as a parallel port, game port or a universal serial bus (USB). A Monitor 316 or other type of display device is also connected to the System Bus 306 via an interface, such as a Video Interface 318. In addition to the monitor, computer system 300 may also include other peripheral output devices such as Speakers 322 and Printer 324, which may be connected through an Output Peripheral Interface 320.

Computer system 300 may operate in a networked environment using logical connections to one or more Remote Computers 330. Remote Computers 330 may be a personal computer, a server, a router, a network PC, a peer device or other common network node, and typically includes many or all of the elements described above relative to the computer 300. When used in a networking environment, the computer 300 is connected to a remote network through a Network Interface or adapter 328.

The components contained in the computer system of FIG. 3 are those typically found in computer systems suitable for use with the technology described herein, and are intended to represent a broad category of such computer components that are well known in the art. Thus, the computer system of FIG. 3 can be a personal computer, mobile computing device, tablet, workstation, server, minicomputer, mainframe computer, or any other computing device. The computer can also include different bus configurations, networked platforms, multi-processor platforms, etc. Various operating systems can be used.

Figure 4:
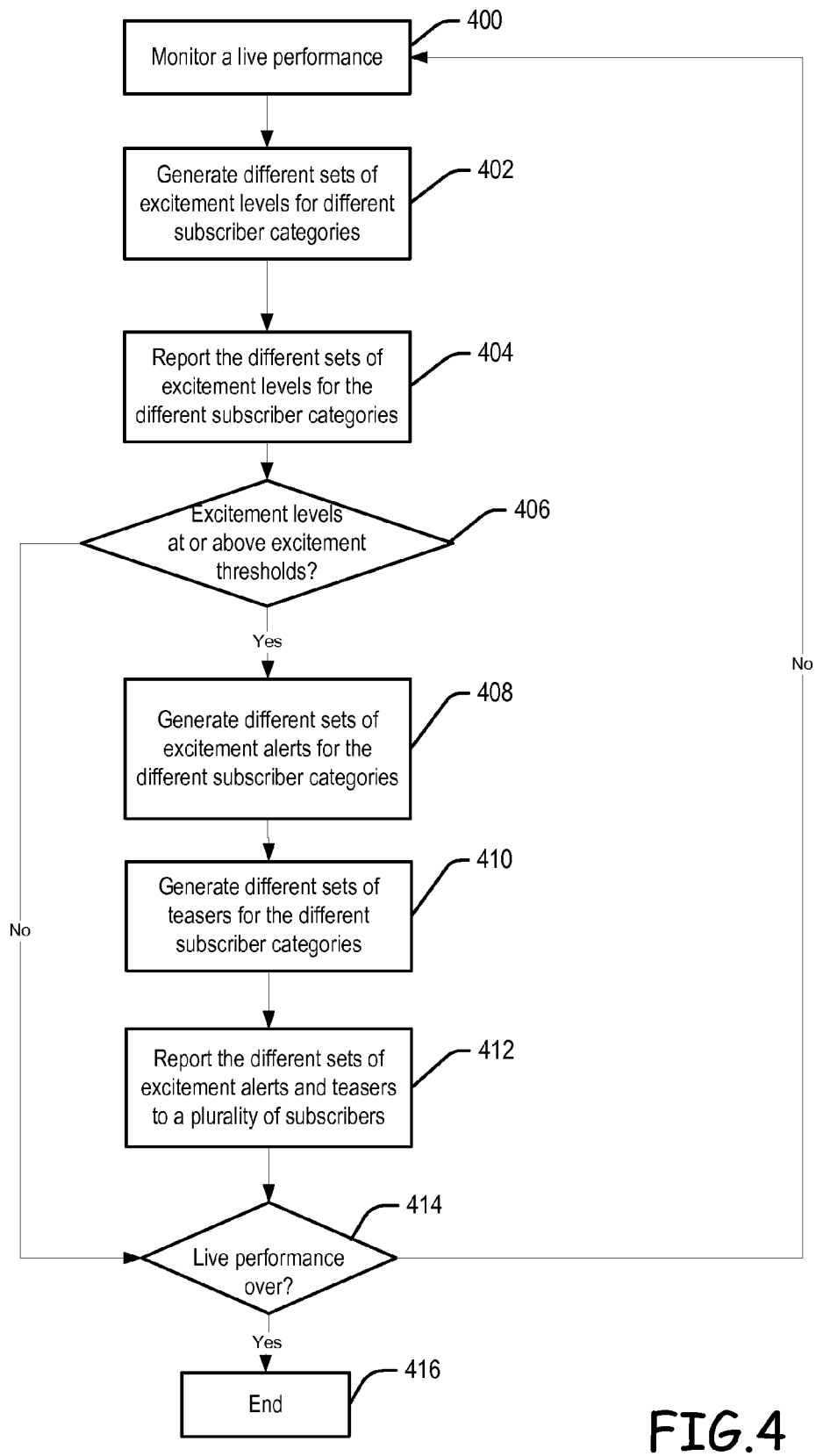
FIG. 4 is a flow chart describing one embodiment of the general concept for generating different sets of excitement levels, excitement curves, alerts and teasers for a live performance.

The devices of FIGS. 1-3 discussed above can be used to implement a system that generates different sets of excitement levels, excitement curves, alerts and teasers for one or more live performances for different categories of subscribers. FIG. 4 is a flow chart describing one embodiment of a process for generating different sets of excitement levels, excitement curves, alerts and teasers for a live performance. In one embodiment, the process of FIG. 4 is performed in real time. In one embodiment, the steps of FIG. 4 may be performed by the software modules in the Application Server 214 and the Analytical Server 216 described in FIG. 2A and FIG. 2B respectively.

In step 400, a live performance is monitored. The process of monitoring a live performance is discussed in more detail in FIG. 4A. Although the process of FIG. 4 is described with respect to monitoring a single live performance, it is to be appreciated that the process of FIG. 4 may be performed for multiple performances (in parallel or serially).

In step 402, different sets of excitement levels are generated for the live performance for different categories of subscribers. In one set of examples, the different categories of subscribers include home team fans, visiting team fans and neutral fans. The process by which different sets of excitement levels are generated for the different categories of subscribers is discussed in more detail in FIG. 4C.

In step 404, the different sets of excitement levels are reported to a plurality of subscribers. The process by which the different sets of excitement levels are reported to a plurality of subscribers is discussed in more detail in FIG. 4D and FIG. 4E In step 406, it is determined if one or more of the excitement levels generated in step 402 are at or above one or more excitement thresholds. In accordance with the disclosed technology, in order to notify subscribers when a live performance begins to get sufficiently exciting, it is determined if an excitement level is at or above a certain value for a specific amount of time. This value is referred to herein as an excitement threshold. Excitement thresholds are discussed in more detail with respect to FIG. 5. If, in step 406, it is determined that none of the excitement levels generated in step 402 are at or above one or more excitement thresholds and the live performance has not ended, then the process continues to monitor the live performance in real-time in step 400.

If there are one or more of the excitement levels that are at or above one or more excitement thresholds for sufficient amount of time (step 406), then in step 408 one or more different sets of alerts are generated for the different categories of subscribers. The process of generating different sets of alerts is discussed in more detail with respect to FIG. 5. In step 410, different sets of teasers are generated for the different categories of subscribers. The process of generating different sets of teasers is discussed in detail in FIG. 6. In step 412, the different sets of alerts and teasers are reported to a plurality of subscribers. The process of reporting the different sets of alerts and teasers is discussed in detail in FIG. 7.

In step 414, it is determined if the live performance has ended. If the live performance has ended, the process ends in step 416. If the live performance has not ended, then the process continues to monitor the live performance in real-time in step 400.

Figure 4A:
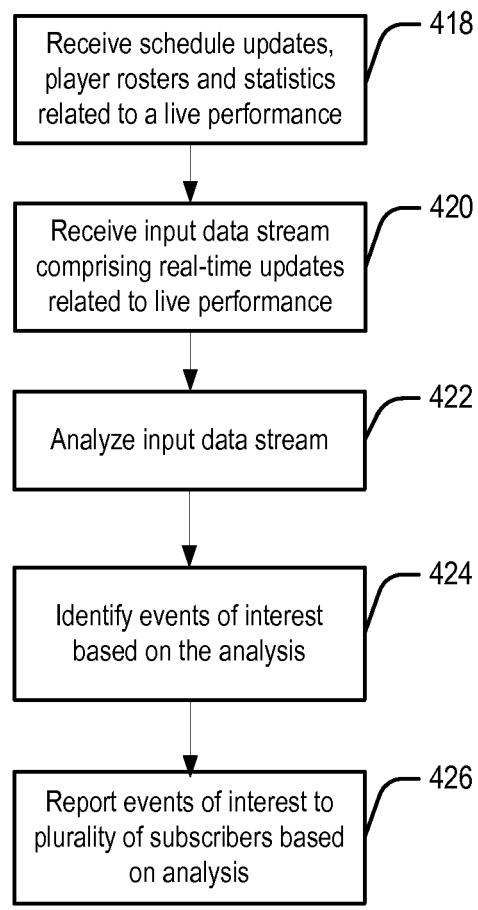
FIG. 4A is a flow chart describing one embodiment of a process for monitoring a live performance in real-time.

FIG. 4A is a flow chart describing a process for monitoring a live performance in real-time. The process of FIG. 4A is one example of performing step 400 of FIG. 4. In one embodiment, the process of monitoring a live performance is performed by the Data transformation module 228 in the Analytical server 216.

In step 418, schedule updates, player rosters and statistics related to an upcoming live performance are received from one or more Data Providers 222. The data can be received electronically via the Internet or by other means. In step 420, an input data stream comprising real-time updates related to the live performance is accessed or received. In one embodiment, the input data stream comprises files (or other data strictures) of play-by-play statistics related to the live performance. In some embodiments, the input data stream is acquired from Data Providers 222. In other embodiments, the input data stream may be generated manually by subscribers viewing the live performance or by one or more computers that process the video of the live performance.

Figures 4B, 4C:
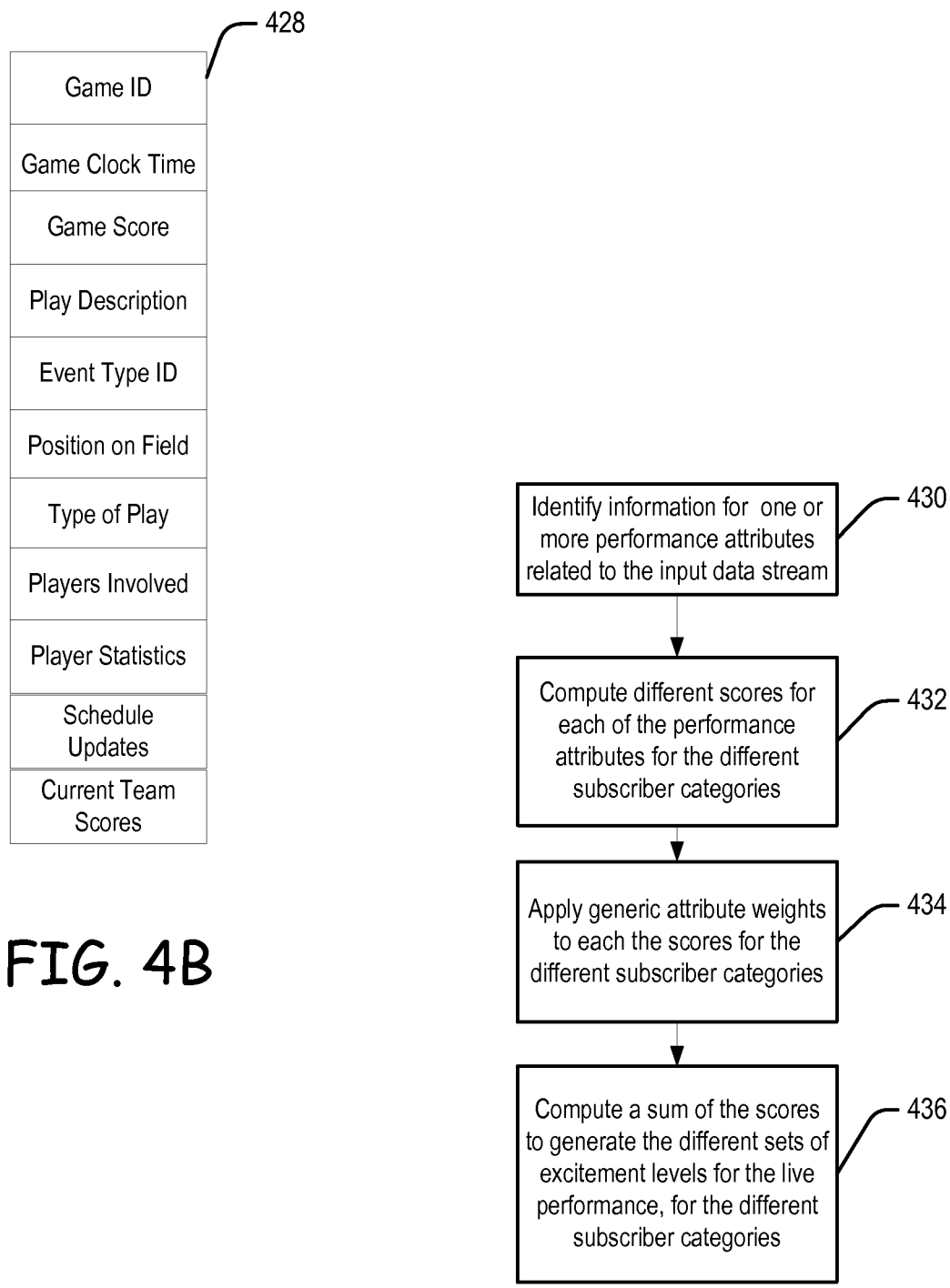
FIG. 4B is an exemplary illustration of the representation of an input data stream as a common data structure of play events related to the live performance.
FIG. 4C is a flow chart describing one embodiment of a process for generating different sets of excitement levels for a live performance for different categories of subscribers.

In step 422, the input data stream is analyzed. In one embodiment, analyzing the input data stream includes transforming the information in the input data stream into a common data structure format of play events that describes an individual play or action of the live performance in a structured way. FIG. 4B is an exemplary illustration of the representation of an input data stream as a common data structure of play events related to the live performance. In one embodiment, the data structure of play events 428 represents a set of real-time measured attributes related to the live performance. The set of real-time measured attributes may include, but are not limited to a game ID, a game clock time, a game score, a play description, an event type ID, a position on the field, type of play, players involved, player statistics, schedule updates and current team scores. Additional context data can also be included The real-time measured attributes may also include real-time updates related to the live performance received from social networking or other communication services such as Twitter® feeds, Facebook® updates or real-time updates received from one or more third party information sources.

In step 424, one or more events of interest in the live performance are identified, based on the analysis. In one example, identifying an event of interest may include identifying a nail-biter event. As used herein, a nail-biter event refers to a situation or activity during the live performance wherein the outcome of the situation or activity is so uncertain that it causes the live performance to become more exciting than usual. For example, in a live sports performance, a nail-biter event is identified as an event in which the score is close, the lead can change at any moment and there is only time left for one more score or a small number of scores. In another embodiment, a nail-biter event can also be identified when or more excitement levels are at or above one or more excitement thresholds as discussed in FIG. 5. Other events of interest can also be identified, such as baseball game with a potential no-hitter, overtime in soccer, a shutout in American football, etc.

In step 426, the event of interest is reported to a plurality of subscribers on their client devices. In one example, the event of interest is reported to the plurality of subscribers along with an excitement level related to the live performance. In one embodiment, the Excitement Level Results Module 226 in the Application Server(s) 214 reports the events of interest to the plurality of subscribers on their client devices. In some embodiments, the events of interest are reported by alerts and teaser, rather than separately as described in FIG. 4A.

In one embodiment, the input data stream is analyzed over different time-intervals. In one embodiment, a first time-interval is measured from the start of the live performance to a current point in time during the live performance. In another embodiment, a second time-interval is measured from a point in time after the start of the live performance to a current point in time during the live performance. For example, the input data stream is analyzed for the most recent X minutes. In this manner, the input data stream is analyzed over two time-intervals or time-windows. In other embodiments, more than two time-intervals may also be used.

In one embodiment, the analysis of the input data stream over different time intervals results in the generation of different types of excitement levels related to the live performance. The generation of excitement levels is discussed in detail in FIG. 4C. In one embodiment, analyzing the input data stream over the first time-interval (from the start of the live performance to a current point in time) results in the generation of different sets of final excitement levels (referred to as final excitement levels) related to the live performance, and analyzing the input data stream over the second time-interval (from a point in time after the start of the live performance to a current point in time) results in the generation of different sets of instantaneous excitement levels (referred to as the instant excitement levels) related to the live performance. The duration of the second time-interval may be predetermined by the system. The duration of the second time-interval determines how instantaneous the excitement levels related to the live performance are. In one example, the duration of the second time-interval is one or a few seconds. In one embodiment, the final excitement levels are an average of the instant excitement levels.

In one embodiment, the analysis of the input data stream over the different time-intervals is implemented using a time-window based decay algorithm. The time-window based decay algorithm weights events that occur during the live performance based on when the events occur, wherein events of interest that occur in the past have a smaller impact on the events of interest occurring in the present. That is, the time-window based decay algorithm is basically a system for reducing the size of the time-interval towards the end of the live performance. For example, consider an event of interest such as a score update that occurs during the live performance. In one embodiment, each time a score update is received in real-time, the value of every contributing score update that occurred from the start of the live performance is re-calculated to determine the different excitement levels for the live performance. This results in the generation of final excitement levels for the live performance. In another embodiment, each time a score update is received in real-time, only the new score updates that occur within the pre-defined time-interval are considered, the old score-updates outside the time-interval are pushed out, and the score-updates are re-calculated from those that are within the time-interval to determine the different excitement levels for the live performance. This results in the generation of instantaneous excitement levels for the live performance.

FIG. 4C is a flow chart describing a process for generating different sets of excitement levels for a live performance for different categories of subscribers. The process of FIG. 4C is one example of performing step 402 of FIG. 4. In one embodiment, the process of FIG. 4C is performed by the Excitement Level Generation Module 230 in the Analytical server 216.

In step 430, the system identifies information (for example, in response to the analysis of the input data stream performed in step 422 of FIG. 4A) related to one or more performance attributes. In one embodiment, the performance attributes represent specific, gradable and qualified aspects of one or more high-level characteristics of the live performance that quantitatively impact the excitement of the live performance. In one embodiment, the performance attributes include a velocity attribute, a parity attribute, a novelty attribute, a momentum attribute and a context attribute related to the live performance.

The velocity attribute measures the energy level of the live performance. For example, for a sport such as cricket, the velocity is measured by the number of runs scored per ball or over, or the number of fours and sixes scored within a period of time. For a sport such as American Football, the velocity may be measured by the yards per play.

The parity attribute measures how close two teams are matched throughout the live performance. The parity attribute also compares how one team scores with respect to the other. For example, the parity attribute may compare the velocity across two teams. It is to be appreciated that for a live performance to be exciting, the parity should ideally be even and the velocity should be high.

The novelty attribute measures the uniqueness of individual events that occur both before and during a live performance. A triple play in baseball, a hat trick in soccer or hockey, a comeback, an upset and a last second shot are examples of events that affect the novelty attribute.

The momentum attribute relates to the shift in the live performance which defines which player or team is doing better with respect to another player or team.

The context attribute defines the existence and extent of any rivalry between teams, importance or prominence of the game (for example, a playoff game vs regular season, or a meeting of two highly ranked teams as opposed to two obscure ones), the impact of a given event on the overall playoff picture, or the importance of a particular game within a playoff series, bracket, or competition. Note that in other embodiments, other attributes can be used instead of or in addition to the above-described attributes.

In step 432, a score for each of the performance attributes in the input data stream is computed. In one example, a velocity score, a parity score, a novelty score, a momentum score and a context score are computed. In one embodiment, step 432 includes computing different scores (e.g., three different scores) for each of the performance attributes for the different subscriber categories. For example, velocity attribute scores for the home team fan, the visiting team fan and the neutral fan are computed; parity attribute scores for the home team fan, the visiting team fan and the neutral fan are computed; novelty attribute scores for the home team fan, the visiting team fan and the neutral fan are computed; momentum attribute scores for the home team fan, the visiting team fan and the neutral fan are computed; and context attribute scores for the home team fan, the visiting team fan and the neutral fan are computed. In such an embodiment, fifteen attribute scores are calculated five for the home team fan, five for the visiting team fan and five for the neutral fan. In other embodiments, more or less than three sets of scores are calculated.

It is to be appreciated that computing different scores for a particular performance attribute results in the generation of different sets of excitement levels for the live performance for the different subscriber categories. In one embodiment, computing different scores for a particular performance attribute comprises increasing or decreasing the value of the attribute based on how the value of the attribute affects the excitement of the live performance for the different subscriber categories. For example, in cricket, one way by which the velocity attribute is measured is based on the number of runs scored per over. In one example, the value of the velocity score may be increased by a certain factor to determine a velocity score for the home team, while the value of the velocity score may be decreased by a certain factor to determine a velocity score for the visiting team.

In step 434, generic attribute weights are applied to each of the performance attributes for the different subscriber categories. In one example, the generic attribute weights are computed based on the time elapsed in the live performance. For example, the generic attribute weight applied to a velocity attribute at the start of the live performance is higher as compared to the generic attribute weight applied to the parity attribute at the start of the live performance.

In step 436, a mathematical function (e.g., sum, weighted sum, average, weighted average, or other mathematical function) of the scores and the generic attribute weights applied to each of the performance attributes is computed to generate the different sets of excitement levels for the live performance, for the different subscriber categories. In one embodiment, step 436 includes generating three excitement levels: one for the home team fan based on the attributes calculated for the home team fan, one for the visiting team fan based on the attributes calculated for the visiting team fan, and one for the neutral fan based on the attributes calculated for the neutral fan.

In one embodiment, step 436 includes generating three instant excitement levels (home, visiting and neutral) and three final excitement levels ((home, visiting and neutral). In one embodiment, only final excitement levels are generated. In another embodiment, only instant excitement levels are generated.

In other examples, additional excitement levels may be generated, such as for a fan who does not like one of the teams, a fan who likes low scoring games, a fan who likes a team that is a rival to one of the teams, a fan who likes any close game, etc. For example, an excitement level for a fan who likes low scoring games, for a game such as cricket may be determined by increasing or decreasing the velocity score based on the number of runs scored per over during the live performance.

Additional details relating to computing excitement levels for a live performance is set forth in co-pending patent application Ser. No. 13/037, 243, filed Feb. 28, 2011, entitled, "Method and System For an Online Performance Service With Recommendation Module" published as US 2011/0212756 on Sep. 1, 2011, which is incorporated herein by reference in its entirety.

Figure 4D:
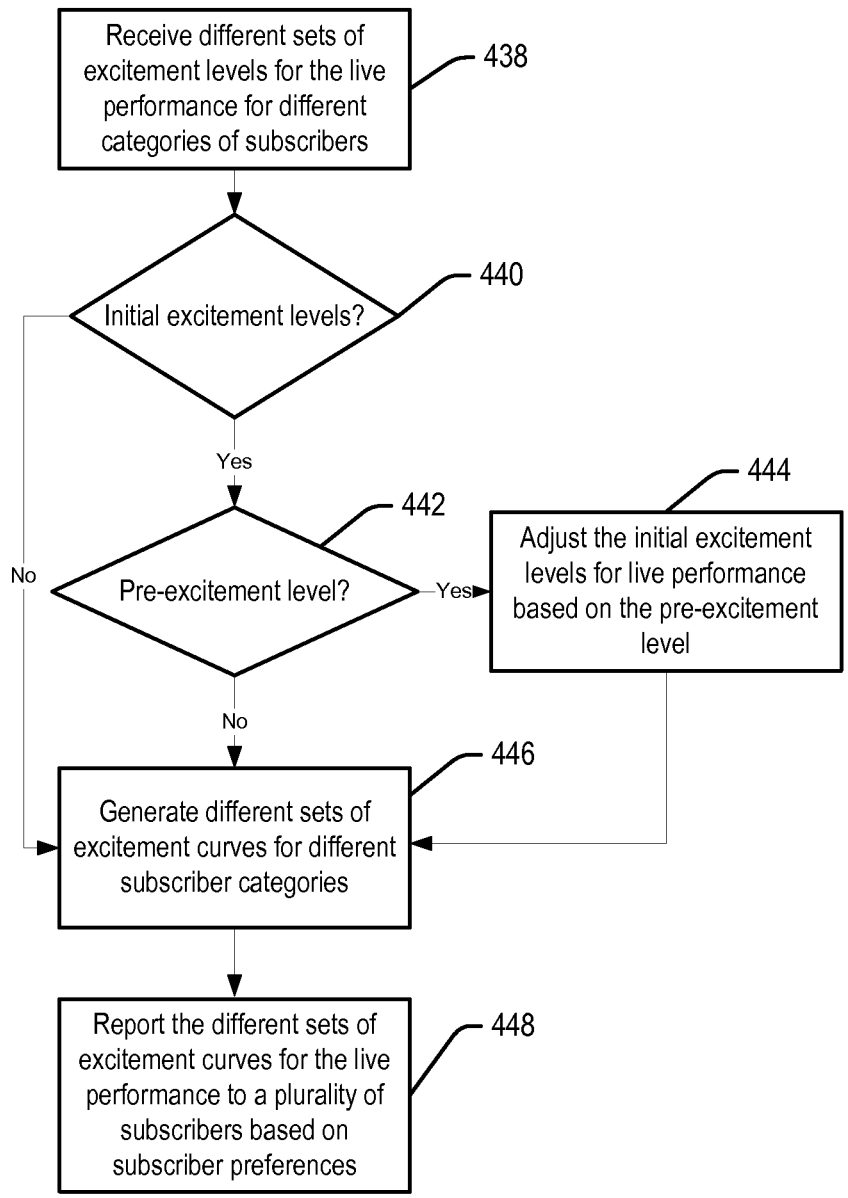
FIG. 4D is a flow chart describing one embodiment of a process for reporting the different sets of excitement levels for a live performance, to a plurality of subscribers.

FIG. 4D is a flow chart describing a process for reporting the different sets of excitement levels for a live performance, to a plurality of subscribers. The process of FIG. 4D is one example of performing step 404 of FIG. 4. In one embodiment, the process of FIG. 4D is performed by the Excitement Level Generation Module 230 in the Analytical Server 216 and the Excitement Level Results Module 226 in the Application server(s) 214.

In step 438, the different sets of excitement levels for the live performance for the different subscriber categories are received from step 402 of FIG. 4. In one embodiment, the Excitement Level Results Module 226 in the Application Server(s) 214 receives the different sets of excitement levels from the Excitement Level Generation Module 230 in the Analytical Server 216. In step 440 it is determined if the different sets of excitement levels correspond to initial excitement levels for the live performance. If so, then in step 442 it is determined if different sets of pre-excitement levels for the different categories of subscribers have been computed for the live performance. As used herein, a pre-excitement level for a live performance is a predicted excitement level for the live performance prior to the commencement of the live performance. In one embodiment, the pre-excitement level is computed based on historical information such as prior performance metrics related to the live performance. If there is a pre-excitement level for the live performance, then in step 444, the initial excitement levels for the live performance for the different categories of subscribers are adjusted to incorporate the pre-excitement level. For example, if the initial excitement level for a live performance is computed as 50 and the pre-excitement level for the live performance is 25, the initial excitement level for the live performance may be computed as an average of the initial and pre-excitement levels.

In step 446, different sets of excitement curves are generated for the different categories of subscribers. In one embodiment, the different sets of excitement curves are a graph of the different sets of excitement levels for the different categories of subscribers at different points in time during the live performance. In one embodiment, the excitement curve is a graph of final excitement levels for a live performance from the start of the live performance to a current point in time during the live performance. FIG. 1B is an exemplary illustration of different sets of excitement curves generated for different categories of subscribers.

In step 448, the different sets of excitement curves for the live performance are reported to the plurality of subscribers. In one embodiment, the different sets of excitement curves for the live performance are reported to the plurality of subscribers in accordance with the subscribers' preferences. For example, if the favorite team of a subset of the plurality of subscribers includes the home team in the live performance, then the excitement curve for the home team fan is displayed to the subset of subscribers. If, for example, the favorite teams of a subset of the plurality of subscribers include both the home team and the visiting team in the live performance, then an aggregate excitement curve representing the excitement level of both teams is displayed to the subset of subscribers.

One embodiment of step 448 includes looking up the subscribers' preference data stored in Database Server 218 and sending the excitement curve for home team fans to subscribers who have preference data indicating that the home team is their favorite team, sending the excitement curve for visiting team fans to subscribers who have preference data indicating that the visiting team is their favorite team and sending the excitement curve for neutral fans to subscribers who do not have preference data indicating that the visiting team or the home is their favorite team. In some embodiment, multiple curves can be sent to and displayed to a subscriber. In some implementations, all curves (or multiple curves) are sent the subscribers and the subscribers' client devices automatically determine which curves to display based on the subscribers preference data. In another implementation, all curves (or multiple curves) are sent the subscribers and the subscriber manually chooses which curves to display.

In one embodiment, the Excitement Level Results Module 226 in the Application server(s) 214 directly reports the different sets of excitement curves for the live performance to a plurality of subscribers in accordance with the subscribers' preferences by transmitting the different sets of excitement curves electronically to the client devices 206, 208 and 210. The excitement curves are displayed to the plurality of subscribers via the Sports Excitement Rating Application 220 in the client devices 206, 208 and 210.

Figure 4E:
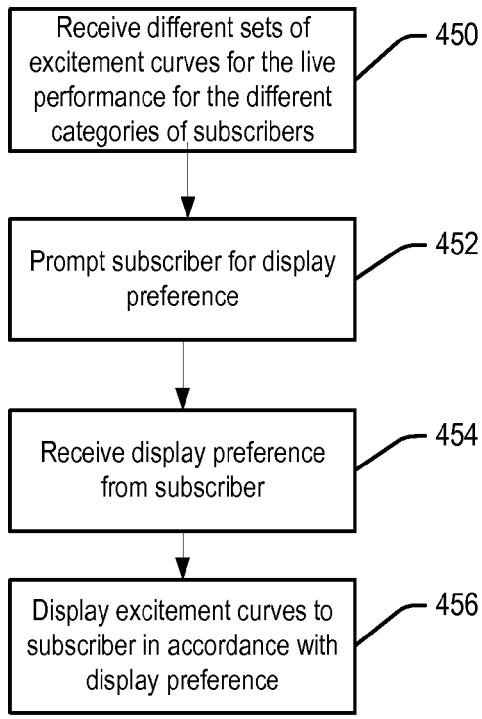
FIG. 4E is a flow chart describing one embodiment of a process for reporting the different sets of excitement curves to a plurality of subscribers.

FIG. 4E is a flow chart describing a process for reporting the different sets of excitement curves to a plurality of subscribers. The process of FIG. 4E is performed at the subscriber's client device in response to receiving the excitement curves that are generated in step 446 of FIG. 4D. In step 450, the different sets of excitement curves for the different categories of subscribers, for the live performance are received. In step 452, the subscriber is prompted with one or more display preferences to view the different sets of excitement curves. In step 454, the subscriber's selection of one or more of the display preferences is obtained, via the Sports Excitement Rating Application 100 in the subscriber's client device. In one embodiment, the display preference of the subscriber may be to view all the different excitement curves for the live performance, namely, the excitement curve for the home team fan, visiting team fan and the neutral team fan. In another embodiment, the display preference of the subscriber may be to view just a subset of the excitement curves for the live performance. In step 456, the different sets of excitement curves are displayed to the subscribers, in accordance with the display preference, via the Sports Excitement Rating Application 220 in the subscriber's client device. As described above, the process of FIG. 4E is for the embodiment where multiple curves are sent to the subscriber. A variation on the process of FIG. 4B includes skipping step 452 and automatically choosing which curve to display based on the stored subscriber preference (e.g., favorite team). A different embodiment only sends one (or a subset) of curves to the subscriber based on subscriber preference stored at the server.

Figure 4F:
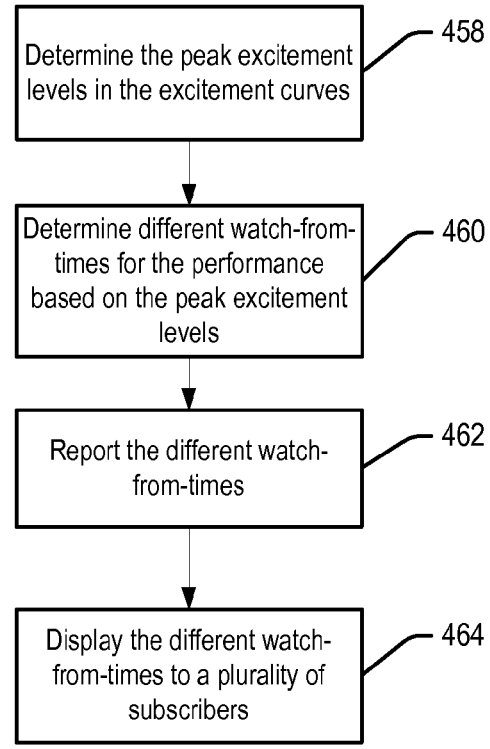
FIG. 4F is a flowchart describing one embodiment of a process for determining a time to start watching a live performance.

In some embodiments, reporting the different sets of excitement curves to a plurality of subscribers includes providing a watch-from-time for subscribers to start watching an exciting event related to the live performance, for example, when subscribers do not have the time to commit to watching the entire performance. FIG. 4F is a flowchart describing one embodiment of a process for determining a time to start watching a live performance. In one embodiment, the process for determining a time to start watching a live performance is performed by the Excitement Level Results Module 226 in the Application Server(s) 214. In step 458, the different sets of excitement curves for the different categories of subscribers are analyzed to identify peak excitement levels in the different excitement curves. The different sets of excitement curves may be generated as discussed in step 446 of FIG. 4D, in one embodiment. In one example, the peak excitement level refers to the highest excitement level that is obtained in an excitement curve. In step 460 different watch-from-times for the different sets of excitement curves of the live performance are determined based on the peak excitement levels. In one embodiment, the watch-from-time refers to a time that precedes the peak excitement level of the live performance by a specified amount of time. The specified amount of time is used to build up the subscriber's excitement that leads to the peak excitement level and may be pre-determined by the system, in one embodiment. In step 462, the different watch-from-times of the live performance are reported to the plurality of subscribers by the Excitement Level Results Module. In one example, the watch-from-time is reported as a specific time to start watching an exciting event in the live performance. In step 464, the different watch-from-times of the live performance are displayed to the plurality of subscribers via the Sports Excitement Rating Application 220 on the subscriber's client device.

In another embodiment, after computing a watch-from-time based on the appropriate excitement curve and thresholds, the events in the play by play may be scanned to determine if the watch-from-time should be modified to include an important event that might otherwise lie outside the established excitement thresholds. Examples of this include a goal in soccer that occurs just before the watch-from-time or a punt in football that begins the start of a drive that later crosses the excitement thresholds.

Figure 5:
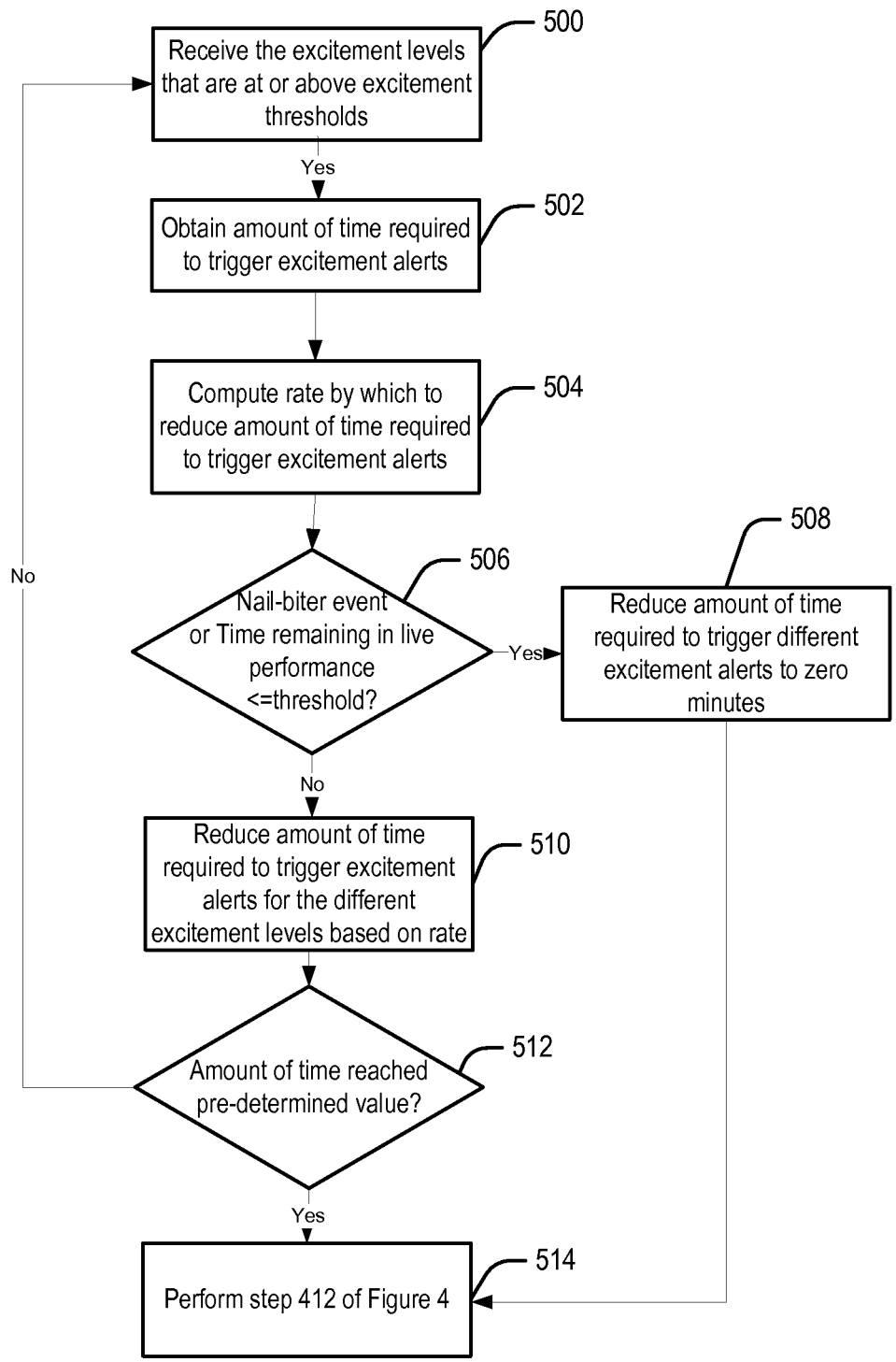
FIG. 5 is a flow chart describing one embodiment of a process for generating different sets of alerts for a live performance, for different subscriber categories.

In some embodiment of the disclosed technology, alerts are generated to notify subscribers that a live performance is exciting. Different sets of alerts are generated for different subscriber categories based on the different sets of excitement levels. FIG. 5 is a flow chart describing a process for generating different sets of alerts for a live performance, for different subscriber categories. In one embodiment, the process for generating different sets of alerts is performed by the Excitement Alert Generation Module 232 in the Analytical Server 214. The process of FIG. 5 is one example of performing step 408 of FIG. 4.

In step 500, the different sets of excitement levels for the live performance that are at or above one or more excitement thresholds are received (for example, in response to determining if one or more excitement levels are at or above one or more excitement thresholds in step 406 of FIG. 4). In one embodiment, the Excitement Alert Generation Module 232 receives the different sets of excitement levels from the Excitement Level Generation Module 230. In one set of examples, the different sets of excitement levels received from the Excitement Level Generation Module 230 correspond to final excitement levels related to the live performance.

In accordance with the disclosed technology, in order for a subscriber to receive alerts only when a live performance begins to get exciting, a subscriber is not notified that a live performance is exciting as soon as an excitement level is at or crosses an excitement threshold. Rather, an excitement alert is sent to a subscriber when the excitement level is at or above an excitement threshold for a specific amount of time. Accordingly, the disclosed technology minimizes the generation of alerts that are false positives or false negatives.

In one implementation of the disclosed technology, an alert bucket is created for every excitement level received (in step 500) that is at or above an excitement threshold. In one set of examples, a first alert bucket is created for excitement levels that are at or above a first excitement threshold of 75, a second alert bucket is created for excitement levels that are at or above a second excitement threshold of 90 and a third alert bucket is created for excitement levels that are at or above a third excitement threshold of 99. In another set of examples, more than three alert buckets may be created. For example, alert buckets may be created for every excitement level that is received whose value is a multiple of 3 between 0 and 100.

In one embodiment, different alert buckets are created for different excitement levels that correspond to the different subscriber categories. In one set of examples, alert buckets for a home team fan, a visiting team fan and a neutral fan are created. It is to be appreciated that in some embodiments, the different sets of excitement levels that are at or above one or more excitement thresholds (received in step 500) may include only an excitement level for the home team fan. In this case an alert bucket is created only for the home team fan. In another embodiment, the different sets of excitement levels that are at or above one or more excitement thresholds (received in step 500) may include excitement levels for the home team fan and the visiting team fan. In this case, alert buckets are created for the home team fan and the visiting team fan.

In one embodiment, the initial size of an alert bucket corresponds to the amount of time (ie in minutes) required to trigger the one or more alerts for the excitement levels that are at or above one or more excitement thresholds. The size of the alert bucket can reduced over time or reduced near the end of the event.

In step 502 of FIG. 5, the amount of time (in minutes) required to trigger one or more alerts for the excitement levels that are at or above the one or more excitement thresholds is determined. In one embodiment, the amount of time (in minutes) required to trigger an excitement alert is pre-determined by the system and is computed using equation (1) shown below:

$$\text{Amount of time(in minutes)} = 15 - 0.625 * (\text{Excitement threshold} * (20-8)) - 0.15625 * (\text{time in minutes elapsed in live performance}) \quad (1)$$

In one embodiment, the amount of time is reduced by a rate based on a function of how much the current excitement level is above the excitement threshold. Accordingly, in step 504, the rate at which to reduce the amount of time required to trigger the different sets of alerts for the excitement levels is determined. In one embodiment, the rate at which to reduce the amount of time required to trigger the different sets of alerts is determined based on a difference between the current excitement level and the excitement threshold and is determined using equation (2) as shown below:

$$\text{Rate} = 1.0 + 0.1 * \max(0, (\text{Current Excitement Level} - \text{Excitement Threshold} - 5)) \quad (2)$$

In another embodiment, the amount of time is increased by a rate based on a function of how much the current excitement level is below the excitement threshold. Accordingly, in step 504, the rate at which to increase the amount of time required to trigger the different sets of alerts for the excitement levels is determined. In one embodiment, the rate at which to increase the amount of time required to trigger the different sets of alerts is determined based on a difference between the current excitement level and the excitement threshold and is determined using equation (3) as shown below:

$$\text{Rate} = 1.0 + 0.1 * \max(0, (\text{Excitement Threshold} - \text{Current Excitement Level} - 5)) \quad (3)$$

It is to be appreciated that an excitement alert for a live performance which is at a current excitement level of 85 will be triggered faster than an excitement alert which is at a current excitement level of 80, given an excitement threshold of 75, based on the rate computed in equation (2). Accordingly, in some embodiments, in step 506, it is determined if the different sets of alerts should be triggered instantaneously so that the plurality of subscribers can be notified of the alerts immediately, based on the rate computed in equation (2). In one embodiment, an excitement alert will be triggered instantaneously if a nail-biter event is identified at the one or more of the excitement levels.

In another embodiment, an excitement alert will be triggered instantaneously when an excitement level is above the excitement threshold and the amount of time remaining in the live performance is less than a threshold value. The threshold value may be pre-determined by the system. For example, if the threshold value specifies that only ten minutes are remaining in the live performance and the excitement level is at a first excitement threshold of 75, an excitement alert will be triggered instantaneously to the plurality of subscribers to notify the subscribers that the live performance is exciting.

Accordingly, in step 506, if a nail-biter event is identified at any of the excitement levels and/or if the amount of time remaining in the live performance is less than a threshold value, then the amount of time required to trigger the different sets of alerts at the different sets of excitement levels is instantaneously reduced to zero minutes in step 508. In step 514, the different sets of alerts are reported to the plurality of subscribers. In one example, reporting the alert includes reporting a teaser in the form of a text message such as "Exciting Game", along with optionally reporting the current excitement level of the live performance. The manner in which the different sets of alerts are reported to a plurality of subscribers is discussed in FIG. 7. In one example, in step 514, when the subscriber is notified of a nail-biter event, the excitement level that is reported to the subscriber is an average of the instantaneous excitement level and the final excitement level.

In step 506, if no nail-biter event is identified at the current excitement level and/or if the amount of time remaining in the live performance is not less than a threshold value, then it step 510, the amount of time required to trigger the different sets of alerts (obtained in step 502) is reduced by the rate determined in step 504 to obtain the remaining time required to trigger the different sets of alerts for the different sets of excitement levels. In one example, the remaining time required to trigger an excitement alert for an excitement level is computed as the difference between the amount of time (computed in equation (1)) and the rate (computed in equation (2)) as shown in equation (3) below:

$$\text{Remaining time(in minutes)}=\text{Amount of time(in minutes)}-\text{Rate(in minutes)} \quad (4)$$

For example, consider that the current excitement level related to a live performance is 75. For purposes of this example, the current excitement level may correspond to an excitement level generated for the home team fan, the visiting team fan or the neutral fan. In one example, the current excitement level is determined to be at a first excitement threshold of 75. If the time in minutes elapsed in the live performance is 30 minutes, the amount of time required to trigger an excitement alert for the current excitement level of 75 is determined as shown in equation (4) below:

$$\text{Amount of time(in minutes)}=15-0.625*(0.75*(20-8))-0.15625*(30)=4.6 \text{ minutes} \quad (5)$$

The amount of time (computed in equation (4)) is then reduced by a rate based on a function of how much the current excitement level is above the excitement threshold. In the above example, the rate at which to reduce the amount of time required to trigger an excitement alert at the current excitement level of 75 is computed as shown in equation (5) below.

$$\text{Rate}=1.0+10*\max(0,(0.75-0.75-0.05))=1 \text{ minute} \quad (6)$$

Therefore, in the above example, the amount of remaining time required to trigger an alert for a current excitement level 75 which is at an excitement threshold of 75 is reduced to (4.6 minutes−1 minute)=3.6 minutes.

Now consider that a new excitement level is generated and the current excitement level has changed to 85. The rate at which to reduce the amount of time required to trigger an excitement alert at the current excitement level of 85 is computed as shown in equation (6) below.

$$\text{Rate}=1.0+10*\max(0,(0.85-0.75-0.05))=1.5 \text{ minutes} \quad (7)$$

Now, based on the new rate determined in equation (6), the amount of time required to trigger an excitement alert for an excitement level of 85 at the excitement threshold of 75 is further reduced to (4.6 minutes−1.5 minutes)=3.1 minutes.

In some embodiments, the amount of remaining time to trigger an alert is calculated separately for the home team fan, the visiting team fan and the neutral fan. Therefore, home team fans may receive an alert, while visiting team and neutral fans do not (or vice versa or other permutation).

In step 512, it is determined if the amount of time required to trigger the alerts has reached a pre-determined value. In one example, the amount of time reaches a pre-determined value when the difference between the amount of time (computed in equation (1)) and the rate (computed in equation (2)) is equal to zero minutes. In the example discussed in equations (4), (5) and (6) above, the amount of time required to trigger an excitement alert for an excitement level which is at an excitement threshold of 75 is determined to be 3.1 minutes. In one example, an excitement alert for the excitement level which is at the excitement threshold of 75 will be triggered when the difference between amount of time and the rate becomes zero minutes.

If the amount of time has reached the pre-determined value, then the process of FIG. 5 performs step 412 of FIG. 4 to report the alert for the live performance in step 514. In one set of examples, different sets of alerts for different subscriber categories (that is, for a home team fan, a visiting team fan and a neutral fan) are reported to the plurality of subscribers in accordance with the subscriber preferences. The process by which the different sets of alerts are reported to a plurality of subscribers is discussed in FIG. 7. In step 512, if it is determined that there is still time remaining to trigger the alerts then the process loops back to step 500 to receive the next set of excitement levels for the live performance.

The process of FIG. 5 discussed above can be used to implement a method to generate different sets of alerts for a plurality of live performances for different categories of subscribers. In another embodiment of the disclosed technology, different sets of teasers are generated based on the different sets of alerts. In one embodiment, a teaser includes sentence fragments about an excitement alert that explains why the live performance is exciting.

FIG. 6 is a flow chart describing a process for automatically generating different sets of teasers for a live performance, for different subscriber categories (ie home team fan, visiting team fan and neutral fan). The process of FIG. 6 is one example of performing step 410 of FIG. 4. In step 600, different sets of alerts related to the live performance are received (for example, from step 408 of FIG. 4). In one embodiment, the Teaser Generation Module 234 receives different sets of alerts from the Excitement Level Generation Module 230 in the Analytical Server 216. In one embodiment, a single teaser is generated for a live performance. In other embodiments, different sets of teasers are generated for different subscriber categories (e.g., different teasers for home team fans, visiting team fans and neural team fans) based on the different sets of alerts. That is, an alert for a home team fan will have a teaser selected for the home team fan, an alert for a visiting team fan will have a different teaser selected for the visiting team fan, and an alert for a neutral fan will have a different teaser selected for the neutral fan. In other embodiments, the home team fan, the visiting team fan and/or the neutral fan can receive the same teaser.

In step 602, one or more sets of rules for one or more teaser categories are accessed. In one embodiment, the sets of rules are accessed from the Teaser dictionary 238 in the Analytical Server 216. In one set of examples, teaser categories for a live sports performance may include, but are not limited to, parity, velocity, defense, comeback and nail-biter. In one embodiment, the rules for each teaser category define whether a particular excitement alert is relevant to a respective teaser category. For example, consider that one or more alerts related to a home team fan, a visiting team fan and a neutral fan are received. The sets of rules for each teaser category are analyzed to determine if any of the alerts are relevant to one or more of the teaser categories. For example, a set of rules for the "parity" teaser category may include a set of conditions such as "no hitter flag for the pitching team=TRUE, nail-biter flag=TRUE and parity value=0.9 for one or more of the alerts to be relevant to the "parity" teaser category.

In step 604, one or more relevant teaser categories, based on the sets of rules are identified for each of the alerts, for the different subscriber categories. For example, a velocity teaser category and a defense teaser category may be identified to be relevant to an excitement alert for the home team fan whereas a parity teaser may be identified to be relevant to an excitement alert for a visiting team fan, and so on.

The different teaser categories each are assigned a priority. In step 606, a chosen teaser category of the relevant teaser categories as having the highest priority is identified for each of the different alerts. In one implementation, the teaser categories are organized in a hierarchy, wherein each category is assigned a competitive code that represents a particular aspect of the category that is worth noting. In one example, a chosen teaser category having the highest priority is identified as the category with the maximum competitive code.

In step 608, the set of rules for the chosen teaser category are accessed to identify one or more pre-stored teasers related to the chosen teaser category. In one example, the pre-stored teasers are text and (optionally) a set of variables such as, "No Hitter for <#team_name> in <#inning>" where <#team_name> and <#inning> are variables. In one embodiment, one or more pre-stored teasers are identified for the different subscriber categories (one or more for home team fans, one or more for visiting team fans and one or more for neutral fans). If no pre-stored teasers are identified, but the excitement alert indicates that the live performance is exciting, a default teaser is selected. The rules can be set up to choose teasers based on the excitement level performance attributes (see step 432 of FIG. 4C), information from the input data stream (see step 420 of FIG. 4A), the play events (see FIG. 4B) and/or other data to find relevant teasers.

The various teasers will each be associated with a static or dynamic priority. A dynamic priority changes based on excitement level performance attributes (see step 432 of FIG. 4C), information from the input data stream (see step 420 of FIG. 4A), and/or the play events (see FIG. 4B). In step 610, the highest priority teaser of the one or more relevant teasers identified in step 608 is chosen. In one embodiment, a teaser of a highest priority is identified based on assigning weights to each of the relevant pre-stored teasers. The weights are assigned based on a degree to which each of the pre-stored teasers satisfy the rules of the chosen teaser category. A teaser of a higher priority is identified as the teaser which has the higher weight. In one embodiment, teasers of highest priority are separately identified for the different subscriber categories, such as the home team fan, the visiting team fan and the neutral fan.

In step 612, the process performs step 412 of FIG. 4 to report the different sets of teasers to a plurality of subscribers. The process of reporting the different sets of teasers is discussed in detail in FIG. 7.

FIG. 7 is a flow chart describing a process for reporting different sets of alerts and teasers to a plurality of subscribers. The process of FIG. 7 is one example of performing step 412 of FIG. 4. In one embodiment, the process of FIG. 7 is performed by the Excitement Level Results Module 226 in the Application server 214. In step 700, the different sets of alerts and teasers for the different categories of subscribers are received (for example, in response to generating the different sets of alerts in step 408, and generating the different sets of teasers in step 410 of FIG. 4). In one embodiment, the Excitement Level Results Module 226 in the Application server 214 receives the different sets of alerts and teasers from the Excitement Alert Generation Module 232 and the Teaser Generation Module 234 in the Analytical Server 216. In one set of examples, alerts and teasers for the different subscriber categories such as the home team fan, the visiting team fan and the neutral fan may be received in step 700. In another set of examples, alerts and teasers for only a subset of the different subscriber categories may be received.

In step 702, the different sets of alerts and teasers are reported to a plurality of subscribers in accordance with an alert level specified by the subscribers. For example, messages are sent via the Internet and one or more networks (wired and wireless) to the one or more client devices. In one embodiment, subscribers may specify a desired alert level based on when they wish to be notified of alerts in a live performance. A first alert level is specified by subscribers who wish to receive alerts when the excitement levels of the live performance are at or greater than an excitement threshold of 75. Such subscribers are referred to herein as Fanatics. A second alert level is specified by subscribers who wish to receive alerts when the excitement levels of the live performance are at or greater than an excitement threshold of 90. Such subscribers are referred to herein as Enthusiasts. A third alert level is specified by subscribers who wish to receive alerts when the excitement levels of the live performance are at or greater than an excitement threshold of 99. Such subscribers are referred to herein as Casual Fans. It is to be appreciated that a subscriber who is a Fanatic will receive more alerts than a subscriber who is an Enthusiast or a Casual Fan. It is also to be appreciated that a subscriber who is a Fanatic will receive alerts earlier in an event compared to subscribers who are Enthusiasts or Casual Fans. The levels for the Fanatic, Enthusiast and Casual Fan can be changed from the levels described above.

In step 704, the different sets of alerts and teasers are displayed to the plurality of subscribers via the Sports Excitement Rating Application 100 in the subscriber's client device. In one example, an excitement alert and a teaser for a live performance that is displayed to a subscriber may include a text message such as "Giants at Dodgers, the lead keeps changing", Excitement Level=79/100 or "An offensive explosion in Toronto." Many different forms of the text for a teaser can be used. As described, different teasers are sent to different subscriber categories based on different excitement levels. For example, home team fans may receive different teasers with different alerts at different times than visiting team and/or neutral fans.

Note that teasers are relevant for other alert types and can be triggered without reaching specific alert levels. In regard to the latter, teasers can be triggered in conjunction with alerts based on events or excitement level in a fantasy match-up; individual athletic performances for favorite athletes, athletes who went to a specific college, athletes on a fantasy team, etc.; notifications sent to a fan by friends or sports experts; a notification sent for a favorite team or athlete indicating an upcoming event about to start, a periodic game update, or a scoring event notification; a notification sent out to communicate that a specific event or athletic performance may represent a potentially valuable wagering opportunity or that one of a person's wagers is currently in a state of great uncertainty and, thus, excitement.

In one embodiment, the step of FIGS. 4, 4A, 4B, 4C, 4D, 4E, 4F, 5, 6 and 7 are performed automatically.

In addition to generating excitement levels during live performances, one embodiment includes generating excitement levels for upcoming performances (predicted excitement) before the performance. Thee generates excitement levels for upcoming performances by mathematically aggregating game context (as defined previously, i.e. team rivalry, playoff race impact, playoff series/game/bracket, etc.), magnitude of the number of comments in the real-time conversation surrounding the given event leading up to the event (such as in Twitter, Facebook, blogs, sports press, etc.), predicted parity of the upcoming event (e.g., Las Vegas odds/spread), and predicted velocity of the upcoming event (e.g. Las Vegas over-under for combined score). The predicted excitement level can fluctuate dynamically as a performance draws closer due to changing odds, updated playoff picture or variations in chatter. The predicted excitement level for an event is communicated on a 0-100 scale. In other embodiments, the predicated excitement level (and/or during-game excitement level) can be restricted to another range (ie 5-95).

One embodiment of the disclosed technology includes a method for generating excitement levels for a live performance. The method includes monitoring a live performance, generating different sets of excitement levels for the live performance, the different sets of excitement levels relate to different sets of subscriber preferences and reporting the different sets of excitement levels to a plurality of subscribers.

One embodiment of the disclosed technology includes a method for generating excitement levels for a live performance. The method includes analyzing an input data stream comprising real-time updates related to the live performance, identifying one or more events of interest in the live performance, based on the analyzing, deriving one or more performance attributes related to the input data stream and generating different sets of excitement levels for the live performance based on the one or more performance attributes for different subscriber categories such that a first set of excitement levels is generated for a first category of subscribers and a second set of excitement levels is generated for a second category of subscribers.

One embodiment of the disclosed technology includes one or more processor readable storage devices having processor readable code embodied on the processor readable storage devices. The processor readable code programs one or more processors to perform a method comprising analyzing an input data stream comprising real-time updates related to the live performance, identifying one or more events of interest in the live performance, based on the analyzing, deriving one or more performance attributes related to the input data stream, computing different scores for each of the performance attributes in the input data stream, for different subscriber categories, applying generic weights to each of the performance attributes for the different subscriber categories and generating different sets of excitement levels for the live performance, for the different subscriber categories based on a sum of the scores for each of the performance attributes and the generic attribute weights applied to each of the performance attributes.

One embodiment of the disclosed technology includes a system for generating excitement levels for a plurality of live performances. The system comprises one or more storage devices storing code, a communication interface and one or more processors in communication with the one or more storage devices and the communication interface. The one or more processors are configured to be in communication with a plurality of client devices via the communication interface based on the code. The code configures the one or more processors to monitor a live performance, generate different sets of excitement levels for the live performance based on the monitoring and report the different sets of excitement levels to a plurality of subscribers. The different sets of excitement levels are for different categories of subscribers.

One embodiment of the disclosed technology includes a method for generating alerts for a live performance. The method comprises monitoring a live performance, generating different sets of excitement levels for the live performance based on the monitoring, the different sets of excitement levels relate to different subscriber categories, for each of the different sets of excitement levels, identifying if any of the excitement levels are at or above one or more excitement thresholds, generating different sets of alerts for the different subscriber categories with respect to the excitement levels are at or above one or more excitement thresholds and reporting excitement alerts that are above one or more excitement thresholds to a plurality of subscribers.

One embodiment of the disclosed technology includes a method for generating alerts for a live performance. The method comprises receiving different sets of excitement levels for a live performance; for each of the different sets of excitement levels, identifying if any of the excitement levels are at or above one or more excitement thresholds; determining an amount of time required to trigger the different sets of alerts for the excitement levels that are at the one or more excitement thresholds; determining whether the excitement levels have been at the one or more thresholds for the determined amount of time required to trigger, for the excitement levels that are at the one or more excitement thresholds; and reporting alerts to a plurality of subscribers for those excitement levels that have been determined to be at the one or more thresholds for the determined amount of time required to trigger.

One embodiment of the disclosed technology includes one or more processor readable storage devices having processor readable code embodied on the processor readable storage devices. The processor readable code programs one or more processors to perform a method comprising monitoring a live performance, generating different sets of excitement levels for the live performance, based on the monitoring, the different sets of excitement levels relate to different subscriber categories, for each of the different sets of excitement levels, identifying if any of the excitement levels are at or above one or more excitement thresholds, determining an amount of time required to trigger the different sets of alerts for the excitement levels that are at the one or more excitement thresholds and reporting the different sets of alerts to the plurality of subscribers when the amount of time required to trigger the different sets of alerts reaches a pre-determined value.

One embodiment of the disclosed technology includes a system for generating alerts for a plurality of live performances. The system comprises one or more storage devices storing code, a communication interface and one or more processors in communication with the one or more storage devices and the communication interface. The one or more processors configured to be in communication with a plurality of client devices via the communication interface based on the code. The code configures the one or more processors to monitor a live performance, generate different sets of excitement levels for different subscriber categories based on the monitoring, identify if any of the excitement levels are at or above one or more excitement thresholds, generate different sets of alerts for the different subscriber categories with respect to the excitement levels are at or above one or more excitement thresholds, and report the different sets of alerts to a plurality of subscribers.

One embodiment of the disclosed technology includes a method for generating teasers for a live performance. The method comprises monitoring a live performance, generating different sets of teasers for the live performance and reporting the different sets of teasers to the subscribers. The different sets of teasers includes different teasers for different categories of subscribers.

One embodiment of the disclosed technology includes a method for generating teasers for a live performance. The method comprises receiving different sets of alerts related to the live performance, accessing one or more sets of rules for one or more teaser categories, the rules for the one or more teaser categories define whether one or more of the alerts are relevant to a respective teaser category, for the one or more alerts, identifying one or more relevant teaser categories based on the sets of rules, for the different subscriber categories, identifying a chosen teaser category of the relevant categories as having a highest priority, for the one or more alerts, for at least the chosen teaser category, accessing a set of rules for identifying one or more pre-stored teasers related to the chosen teaser category, for the different subscriber categories, of the one or more pre-stored teasers identifying a teaser that is of a higher priority, for the different subscriber categories and reporting the identified teaser to a plurality of subscribers.

One embodiment of the disclosed technology includes one or more processor readable storage devices having processor readable code embodied on the processor readable storage devices. The processor readable code programs one or more processors to perform a method comprising monitoring a live performance, the monitoring comprising receiving different sets of alerts related to the live performance, accessing one or more sets of rules for one or more teaser categories, the rules for the one or more teaser categories define whether one or more of the alerts are relevant to a respective teaser category, automatically generating different sets of teasers for the live performance based on the sets of rules, the different sets of teasers relate to different subscriber categories and reporting the different sets of teasers to a plurality of subscribers.

One embodiment of the disclosed technology includes a system for generating teasers for a plurality of live performances. The system comprises one or more storage devices storing code, a communication interface, and one or more processors in communication with the one or more storage devices and the communication interface. The one or more processors are configured to be in communication with a plurality of client devices via the communication interface based on the code. The code configures the one or more processors to monitor a live performance, generate different sets of teasers for the live performance and report the different sets of teasers to a plurality of subscribers, the different sets of teasers relate to different subscriber categories.

The foregoing detailed description has been presented for purposes of illustration and description. It is not intended to be exhaustive or to limit the claims to the precise form disclosed. Many modifications and variations are possible in light of the above teaching. The described embodiments were chosen in order to best explain the principles of the technology disclosed herein and its practical application, to thereby enable others skilled in the art to best utilize the technology in various embodiments and with various modifications as are suited to the particular use contemplated. It is intended that the scope be defined by the claims appended hereto.

What is claimed is:

1. A method for generating teasers for a live performance, comprising:
    monitoring a live performance;
    generating different sets of teasers for the live performance, the different sets of teasers includes different teasers for different categories of subscribers, wherein generating the different sets of teasers comprises:
        receiving different sets of alerts related to the live performance, the different sets of alerts correspond to one or more excitement levels related to the live performance that are at or above the one or more excitement thresholds, wherein the different sets of alerts relate to different subscriber categories,
        accessing one or more sets of rules for one or more teaser categories, the rules for the one or more teaser categories define whether one or more of the alerts are relevant to a respective teaser category,
        for the one or more alerts, identifying one or more relevant teaser categories based on the sets of rules, for the different subscriber categories,
        identifying a chosen teaser category of the relevant categories as having a highest priority, for the one or more alerts,
        for at least the chosen teaser category, accessing a set of rules for identifying one or more pre-stored teasers related to the chosen teaser category, for the different subscriber categories, and
        of the one or more pre-stored teasers identifying a teaser that is of a higher priority, for the different subscriber categories; and
    reporting the different sets of teasers to the subscribers, the monitoring, generating and reporting are performed by one or more processors.

2. The method of claim 1, wherein the teasers include at least sentence fragments about the one or more alerts related to the live performance.

3. The method of claim 1, wherein identifying a teaser of a higher priority comprises assigning weights to each of the one or more pre-stored teasers, wherein the weights are determined based on a degree by which each of the one or more pre-stored teasers satisfy the rules of the chosen teaser category.

4. The method of claim 1, further comprising identifying a default teaser based on the excitement alert of the live performance when no pre-stored teasers are identified and reporting the default teaser to the plurality of subscribers.

5. The method of claim 1, wherein reporting the different sets of teasers comprises reporting a teaser for a home team fan, a visiting team fan and a neutral fan during the live performance.

6. The method of claim 1, wherein reporting the different sets of teasers comprises displaying the different sets of teasers and the different sets of alerts related to the live performance to a plurality of subscribers on one or more display devices.

7. A method for generating teasers for a live performance, comprising:

receiving different sets of alerts related to the live performance, wherein the different sets of alerts correspond to one or more excitement levels related to the live performance that are at or above one or more excitement thresholds, the different sets of alerts correspond to different subscriber categories;

accessing one or more sets of rules for one or more teaser categories, the rules for the one or more teaser categories define whether one or more of the alerts are relevant to a respective teaser category;

for the one or more alerts, identifying one or more relevant teaser categories based on the sets of rules, for the different subscriber categories;

identifying a chosen teaser category of the relevant categories as having a highest priority, for the one or more alerts;

for at least the chosen teaser category, accessing a set of rules for identifying one or more pre-stored teasers related to the chosen teaser category, for the different subscriber categories;

of the one or more pre-stored teasers identifying a teaser that is of a higher priority, for the different subscriber categories; and reporting the identified teaser to a plurality of subscribers;

the receiving different sets of alerts, accessing one or more sets of rules, identifying one or more relevant teaser categories, identifying the chosen teaser category, accessing the set of rules for identifying, identifying the teaser and reporting are performed by one or more processors.

8. The method of claim 7, wherein the teasers include at least sentence fragments about the one or more alerts related to the live performance.

9. The method of claim 7, wherein identifying a teaser of a higher priority comprises assigning weights to each of the one or more pre-stored teasers, wherein the weights are determined based on a degree by which each of the one or more pre-stored teasers satisfy the rules of the chosen teaser category.

10. The method of claim 7, wherein reporting the different sets of teasers comprises displaying the different sets of teasers and the different sets of alerts related to the live performance to a plurality of subscribers on one or more display devices.

11. One or more processor readable storage devices having processor readable code embodied on the processor readable storage devices, the processor readable code for programming one or more processors to perform a method comprising:

monitoring a live performance, the monitoring comprising receiving different sets of alerts related to the live performance;

accessing one or more sets of rules for one or more teaser categories, the rules for the one or more teaser categories define whether one or more of the alerts are relevant to a respective teaser category;

automatically generating different sets of teasers for the live performance based on the sets of rules, the different sets of teasers relate to different subscriber categories, wherein generating the different sets of teasers further comprises:

for the one or more alerts, identifying one or more relevant teaser categories based on the sets of rules, for the different subscriber categories, identifying a chosen teaser category of the relevant categories as having a highest priority, for the one or more alerts, for at least the chosen teaser category, accessing a set of rules for identifying one or more pre-stored teasers related to the chosen teaser category, for the different subscriber categories, and of the one or more pre-stored teasers identifying a teaser that is of a higher priority, for the different subscriber categories; and reporting the different sets of teasers to a plurality of subscribers.

12. A system for generating excitement levels for a plurality of live performances comprising:

one or more storage devices storing code;
a communication interface; and
one or more processors in communication with the one or more storage devices and the communication interface, the one or more processors configured to be in communication with a plurality of client devices via the communication interface based on the code, wherein the code configures the one or more processors to monitor a live performance, generate different sets of teasers for the live performance and report the different sets of teasers to a plurality of subscribers, the different sets of teasers relate to different subscriber categories, the one or more processors receive different sets of alerts related to the live performance and access one or more sets of rules for one or more teaser categories, the rules for the one or more teaser categories define whether one or more of the alerts are relevant to a respective teaser category, the one or more processors identify one or more relevant teaser categories based on the sets of rule, the one or more processors identify a chosen teaser category of the relevant categories as having a highest priority, the one or more processors access a set of rules to identify one or more pre-stored teasers related to the chosen teaser category, the one or more processors identify a teaser that is of a higher priority and report the teaser to the plurality of subscribers.

13. The system of claim 12, wherein:
the one or more processors report a teaser a home team fan, a visiting team fan and a neutral team fan related to the live performance, to the plurality of subscribers on one or more display devices.

* * * * *